(12) United States Patent
Zamperla

(10) Patent No.: US 10,814,829 B2
(45) Date of Patent: Oct. 27, 2020

(54) PASSENGER RESTRAINT DEVICE FOR AMUSEMENT RIDES

(71) Applicant: ANTONIO ZAMPERLA S.P.A., Altavilla Vicentina (IT)

(72) Inventor: Antonio Zamperla, Altavilla Vicentina (IT)

(73) Assignee: ANTONIO ZAMPERLA S.P.A., Altavilla Vicentina (IT)

( * ) Notice: Subject to any disclaimer, the term of this patent is extended or adjusted under 35 U.S.C. 154(b) by 0 days.

(21) Appl. No.: 15/918,541

(22) Filed: Mar. 12, 2018

(65) Prior Publication Data

US 2018/0201224 A1 Jul. 19, 2018

Related U.S. Application Data

(63) Continuation of application No. 14/702,128, filed on May 1, 2015, now Pat. No. 9,914,428, which is a
(Continued)

(30) Foreign Application Priority Data

Jun. 4, 2013 (EP) .................................... 13170529

(51) Int. Cl.
*A63G 31/00* (2006.01)
*B60R 22/12* (2006.01)
(Continued)

(52) U.S. Cl.
CPC ................ *B60R 22/12* (2013.01); *A63G 7/00* (2013.01); *B60N 2/002* (2013.01); *B60R 21/00* (2013.01);
(Continued)

(58) Field of Classification Search
CPC ........... B60R 2021/01265; B60R 2021/01546; B60R 2022/4816; B60N 2/002;
(Continued)

(56) References Cited

U.S. PATENT DOCUMENTS 5,129,704 A 7/1992 Kishi et al.
5,758,582 A 6/1998 Gnezdilov
(Continued)

FOREIGN PATENT DOCUMENTS

EP 1 069 002 A1 1/2001
EP 1 394 003 A2 3/2004
(Continued)

OTHER PUBLICATIONS

International Search Report, dated Jan. 24, 2014, issued in International Application No. PCT/EP2013/073998.
(Continued)

*Primary Examiner* — Kien T Nguyen
(74) *Attorney, Agent, or Firm* — Hunton Andrews Kurth LLP

(57) ABSTRACT

A passenger restraint device for amusement rides and a method for retaining at least one passenger by means of the restraint device. The device comprises at least one restraint element provided with at least one contact surface intended to be placed in contact with at least one part of the body of a passenger. The restraint element is movable between at least one open position, in which the restraint element is not in contact with the passenger and at least one closed position in which the restraint element is in contact with at least one part of the passenger's body.
The restraint element comprises at least one sensor to detect a contact between the restraint element and at least one part of the body of the passenger, preferably a contact with a passenger's thighs.

24 Claims, 20 Drawing Sheets

Related U.S. Application Data continuation of application No. PCT/EP2013/073998, filed on Nov. 15, 2013.

(51) Int. Cl.
| | |
|---|---|
| *A63G 7/00* | (2006.01) |
| *B60R 21/015* | (2006.01) |
| *B60R 21/02* | (2006.01) |
| *B60N 2/00* | (2006.01) |
| *B60R 21/00* | (2006.01) |

(52) U.S. Cl.
CPC ...... *B60R 21/015* (2013.01); *B60R 21/01512* (2014.10); *B60R 21/01524* (2014.10); *B60R 21/02* (2013.01); *B60R 2021/0097* (2013.01)

(58) Field of Classification Search
CPC .......... B60N 2/2815; B60N 2002/0268; B60N 2002/0272; A63G 31/00; A63G 31/16
USPC ....... 472/43, 59–61, 130; 180/268–270, 271, 180/273; 297/464, 468, 469
See application file for complete search history.

(56) References Cited

U.S. PATENT DOCUMENTS

| | | | |
|---|---|---|---|
| 6,224,491 B1 | 5/2001 | Hiromi et al. | |
| 6,260,650 B1* | 7/2001 | Gustavsson | B60K 28/04 |
| | | | 180/268 |
| 6,287,211 B1 | 9/2001 | Bolliger et al. | |
| 6,750,764 B1 | 6/2004 | Henninger | |
| 7,770,522 B2 | 8/2010 | Muller et al. | |
| 7,905,789 B2 | 3/2011 | Collins et al. | |
| 7,914,384 B2 | 3/2011 | Roodenburg et al. | |
| 8,217,770 B2* | 7/2012 | Messner | G08C 17/02 |
| | | | 180/268 |
| 2004/0032157 A1 | 2/2004 | Trimborn | |
| 2005/0275275 A1 | 12/2005 | Muller et al. | |

FOREIGN PATENT DOCUMENTS

| | | |
|---|---|---|
| EP | 1 618 933 A1 | 1/2006 |
| EP | 2329998 A1 | 6/2011 |
| WO | 98/29719 A1 | 7/1998 |
| WO | WO 99/22830 A1 | 5/1999 |
| WO | WO 01/74626 A1 | 10/2001 |

OTHER PUBLICATIONS

European Search Report, dated Jul. 16, 2013, issued in European Application No. 13170529.5.

European Search Report issued in European Application No. 18186682.3, dated Mar. 1, 2019.

Notice of Opposition issued in EP Application No. 3003789, dated May 9, 2019.

\* cited by examiner

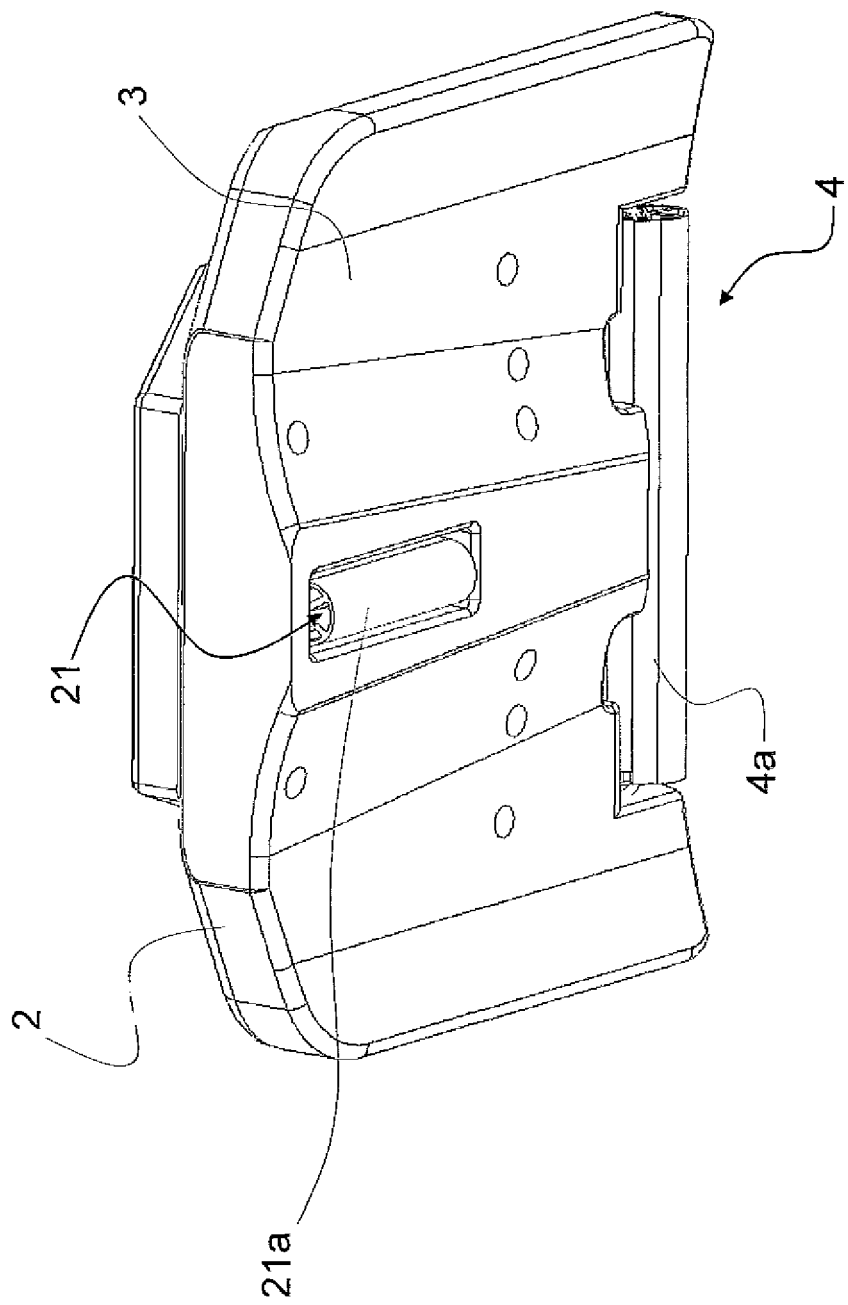

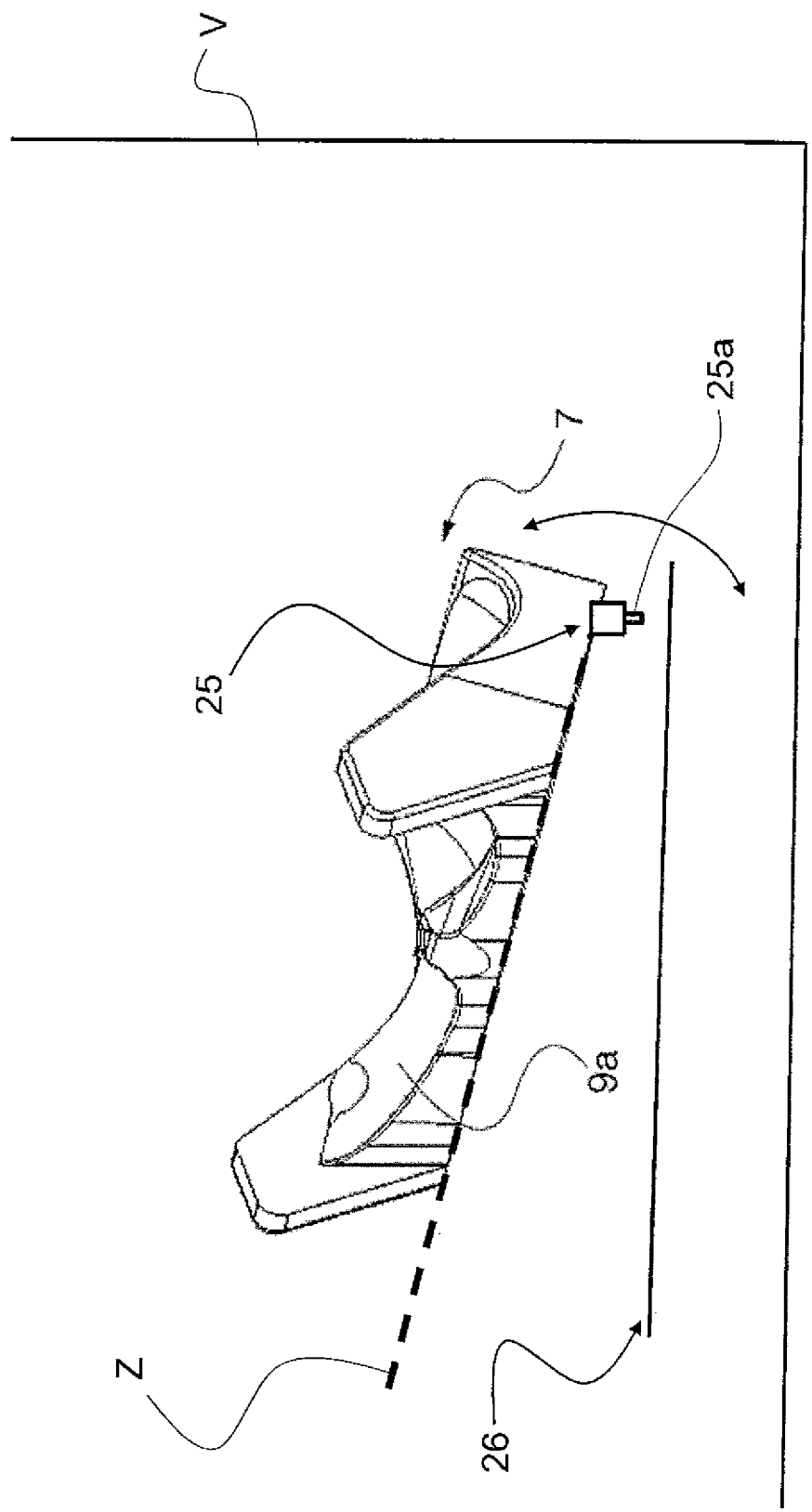

PASSENGER RESTRAINT DEVICE FOR AMUSEMENT RIDES

CROSS-REFERENCE TO RELATED APPLICATIONS

The present application is a continuation of U.S. patent application Ser. No. 14/702,128, filed on May 1, 2015, which is a continuation of International Patent Application No. PCT/EP2013/073998, filed on Nov. 15, 2013, which claims priority to application Ser. No. 13/170,529.5, filed in the European Patent Office on Jun. 4, 2013, each of which is expressly incorporated herein in its entirety by reference thereto.

FIELD OF THE INVENTION

The present invention relates to a restraint device to secure a passenger, and in particular to a restraint device for passengers of amusements rides. The present invention also relates to a method for retaining one or more passengers by means of a restraint device according to the invention.

The present invention also relates to a seat for amusement rides provided with at least one sensor to detect the presence of a passenger on the seat. The passenger restraint device according to the invention can be used with different types of amusement rides, in which the passengers are moved and transported.

BACKGROUND INFORMATION

Amusement rides, and in particular roller coaster rides, comprise one or more seats in which the passengers can be accommodated to be moved and transported while they undergo forces and accelerations. Because of the accelerations and forces caused by the amusement rides on the passengers it is necessary to provide restraint devices to secure passengers to their seats during the movement of the amusement ride. The restraint devices are designed to prevent that passengers are subjected to undesired or dangerous movements.

A restraint device should effectively retain the passengers without being too constrictive. In other words, in the restraint device design process it has to be taken into account the balance between the effective retaining function offered and the possibility to allow passenger to perform some movements in order to increases the sensations and feelings, i.e. the thrill, during the ride.

U.S. Pat. No. 6,287,211, for example, discloses a restraint device comprising a pivotable bar fixed at one end to the floor in front of the passenger seat, and provided at the other end with a restraint element. The restraint element is intended to be brought in contact with the passenger's thighs thus allowing a passenger to perform movements with his arms in order to enhance his sensations and feelings during the ride.

However, the known restraint devices, as well as the device according to U.S. Pat. No. 6,287,211, suffer of the problem that they can be uncomfortable or dangerous to passengers of different sizes.

In fact, the known restraint devices are designed and dimensioned for people of a standard range of body size and conformation, thus known devices cannot be easily adapted to passengers of different sizes, i.e. passengers of different height and weight. There also is a danger that smaller passengers, as well as children, may not be effectively secured and retained in by restraint device designed for larger passengers. Alternatively, larger passengers may have their legs and thighs uncomfortably compressed by known securing devices designed for standard passengers.

The known restraint devices, for example of the type disclosed in U.S. Pat. No. 6,287,211, cannot be used for small size passengers and for children. In fact, when the pivotable arm is rotated, a gap could remain between the restraint element and the passenger's thighs, especially in the case of smaller sized passenger. In fact, the movement of the pivotable bar is designed for predetermined type of passenger and cannot be adapted to different sizes. Therefore, it is possible that the final position of the pivoting movement of the bar cannot be sufficient to ensure a correct, comfortable and effective retention of passengers of all sizes.

Additionally, the restraint element of known restraint devices might be locked in an incorrect position, i.e. a position in which there is a gap between the restraint element and the passenger. In other words, known restraint devices can be locked in position in which they cannot ensure the effective retention of the passenger.

SUMMARY

Therefore, it is an object of the present invention to overcome the problems of the known devices and to provide a restraint device that can be adapted to passengers of different sizes.

It is a further object of the present invention to provide a restraint device that allows some free movements of the passengers, thus increasing the sensations and feelings to which they are subjected during the ride, and at the same time that allow to retain them in an effective way.

A further object of the present invention is to provide a passenger restraint device that can be locked only if it is in an effective closed position, thus preventing the possibility of locking the restraint device in a position that is not able to effectively retain the passenger.

The passenger restraint device for amusement rides comprises at least one restraint element provided with at least one contact surface intended to be placed in contact with at least one part of a passenger. The restraint device comprises at least one moveable bar to which the restraint element is constrained. The at least one bar is movable between at least one open position, in which the restraint element is not in contact with the passenger and at least one closed position in which the restraint element is in contact with at least one part of the passenger's body.

The movement of the movable bar in order to cause the displacement of the restraint element from the at least one open position towards the passenger, in order to reach at least one closed position, can be obtained by manually operating the at least one movable bar or automatically by suitable moving means known in the art.

A restraint element of the restraint device comprises at least one sensor to detect a contact between the restraint element and at least one part of the body of the passenger.

The at least one sensor is a contact sensor. The sensor intended to detect the contact with the passenger is a contact switch sensor. The expression "contact switch sensor" is used herein to indicate a sensor that is able detect the direct, or indirect, contact with at least part of the passenger's body, that causes the displacement of at least one movable element of the sensor. The sensor can be a biased contact switch sensor, for example a "push-button" type sensor, wherein the displacement of a movable element of the sensor is biased by an elastic element.

Advantageously, the correct contact position of the restraint element with the passenger's body is detected by means of the sensor.

In particular, the restraint device according to the invention is able to detect if a gap remains between the passenger's body and the restraint element. Additionally, it can also be detected if the restraint element has not reached the contact with the passenger, for example because the size body of the passenger is too small and cannot be effectively retained by the device.

As described above, the at least one sensor comprises at least one movable element that is intended to be displaced by the contact with at least one part of the passenger's body.

The at least one movable element of the sensor can be contacted directly by at least part of the passenger's body or indirectly, for example by means of at least one press element. In particular, the movable element of the sensor, that is intended to couple or decouple electric contacts of the sensor, can be directly contacted by the passenger's body, or indirectly by means of another element, i.e. a press element.

Preferably, the movable element of the sensor is arranged on the restraint element.

The movable element of the at least one sensor can be movable with respect to the restraint element, and in particular with respect to the contact surface of the restraint element. The movable element of the at least one sensor can be arranged on the internal side the restraint element. In other words, the movable element is not arranged on an external surface of the restraint element and therefore it cannot be contacted directly by at least part of the passenger's body.

In this case, at least one press element can be used to exert a pressure on the movable element of the sensor to activate it.

The restraint element can be movable with respect to the movable bar to which it is constrained, and it is preferably pivotally constrained (i.e. rotatable) with respect to the movable bar. The sensor is activated by the at least one press element upon the movement, preferably the rotation, of the restraint element with respect to the movable bar. In this case, the restraint element may be provided with biasing means, preferably a spring, more preferably a gas spring, that is compressed upon contact of the restraint element with the passenger's body.

As further discussed herein below, according to an embodiment of the invention the movable element of the sensor can be arranged at least in part under the surface, i.e. within the body, of the restraint element and can be arranged coplanar with the external surface (contact surface) of the restraint element or it can be arranged at least in part protruding from the restraint element.

Additionally, the at least one sensor can be arranged on at least one contact surface of the restraint element. The sensor, and in particular its at least one movable element, may be arranged to be coplanar with the contact surface of the restraint element or in such a way that it protrudes at least in part from the contact surface of the restraint element, i.e. the surface that is going to be in contact with a part of the body of the passenger.

The at least one contact surface can be arranged on the bottom of the restraint element, and preferably it is intended to be brought in contact with the thighs of a passenger. The at least one sensor can be arranged on the restraint element, and in particular the contact surface can be arranged at least in part on the lateral surface of the restraint element, and the sensor is intended to contact the thighs and/or the abdomen of a passenger.

The at least one sensor of the restraint device can be used in such a way that a direct, or indirect, contact of the passenger's body with the at least one movable element of the sensor is used to activate the sensor, for example by coupling the electric contacts of the sensor. However, the at least one sensor can be arranged so that the at least one movable element is pressed when the restraint element is not in contact with the passenger's body, for example, by at least one press element. When the restraint element is contacted by at least part of the passenger's body, the sensor is no longer activated and the movable element of the sensor is no longer pressed. Therefore, the contact of the restraint element with passenger's body can be detected because the sensor is deactivated.

Advantageously, the restraint element may be designed to have substantially a pad shape. In other words the restraint element is provided with at least one substantially flat contact surface intended to be brought in contact with the passenger. This configuration allows at the same time to effectively secure the passenger and to allow some safe movements of the latter in order to increase the sensations and the thrill during the ride.

The restraint element can be shaped to contact the thighs of the passenger; however, the restraint device according to the invention is not limited to such use. The restraint element and its contact surface can be designed so as to contact other parts of the passenger's body. The restraint element can be designed to contact the abdomen or the upper parts of the thighs (close to the abdomen and the hips) of a passenger, and in this case the sensor is arranged at least in part on the lateral surface of the restraint element.

The at least one movable bar intended to cause the movement of the restraint element from the at least one open position towards the passenger, is pivotable about at least one rotation axis R. The at least one movable bar can be directly rotatable about a rotation axis, or indirectly, i.e. by means of the interposition of kinematic links or connections.

The movement of the movable bar can also be provided as a translation movement (a rectilinear movement), or as a combination of a rotational movement about an axis and of a translation movement.

The at least one passenger can be retained in one or more seats, provided with the restraint device. The one or more seats for the passenger can be provided with at least one sensor to detect the presence of a passenger on the seat. The presence of at least one sensor intended to detect the presence of the passenger on the seat is particularly advantageous when the sensor intended to contact the passenger is not activated (and in general in the case where the sensor does not detect a contact with the passenger) and there is the need to verify if the seat is empty, or if a passenger is on the seat and he had not correctly brought the restraint element in contact with part of his body, for example by leaving a gap between the passenger's body and the restraint element.

The seat for an amusement ride can be provided with at least one restraint device for securing at least one passenger on the seat. Notwithstanding this, the seat according to the invention can be provided with different restraint devices, known in the art, for example a belt, or a restraint element that is moved to reach a locking position with another cooperating part, etc.

The seat can be provided with means for detecting the locking of the restraint device in at least one position wherein the passenger is secured to the seat. Advantageously the seat can be controlled so that if the sensor of the seat detects the presence of a passenger on it, there is the need to wait a confirmation of the locking of the restraint device by the detecting means. The rotation axis of the at least one movable bar can be arranged in the upper part or the lower part of the passenger seat.

In other words, the rotation axis around which the movable bar can be displaced from the at least one open position to at least one closed position wherein the restraint element is in contact with at least part of the passenger, can be arranged substantially above or below the passenger. For example, the movable arm can be rotated about an axis placed on the floor in front of the passenger.

The at least one rotation axis of the at least one movable bar can be arranged substantially on the upper portion of the passenger seat, and in particular substantially in correspondence of the upper portion of the backrest of the at least one seat.

Moreover, the restraint device can be further provided with locking means to lock the movement of the at least one movable bar in order to retain the passenger when the movement of the amusement ride starts.

Advantageously, locking means of the device are activated only when the at least one sensor detects the contact of the restraint element with at least one part of the passenger. The locking means are activated when the at least one sensor enters into contact with at least part of the passenger. In particular, the at least one movable element of the at least one sensor is displaced due to the contact with at least part of the passenger, thus allowing to detect the contact of the restraint device with the passenger.

The sensor is used in such a way that it is not activated when the restraint element is in contact with a passenger's body, and the deactivation of the sensor, caused by the contact between the restraint element and the passenger's body, is used to inform the controls system that the restraint is closed.

By doing so, the movable bar can be locked only when the restraint element has reached the final position in which it is in contact with at least part of the passenger and his effective retention can be obtained.

The present invention also relates to a method for retaining at least one passenger of an amusement ride using at least one restraint device briefly discussed above.

The method comprises the step of moving the restraint element from the at least one open position, in which the restraint element is not in contact with the passenger, towards the passenger, to reach the at least one closed position. Preferably, this step is carried out by moving the at least one movable bar to which the at least one restraint element is constrained.

The movement of the restraint element, preferably by means of the at least one movable bar, from the at least one open position, towards the passenger, in order to reach at least one closed position in which the restraint element is in contact with a passenger's body, can be obtained by manually operating the restraint element, and in particular the at least one movable bar, or automatically by suitable moving means known in the art.

The method includes a step of detecting by means of the at least one sensor when the at least one restraint element has reached the at least one closed position wherein the at least one restraint element is in contact with at least one part of at least one passenger's body.

The detection step of the contact between the restraint element and the passenger is carried out by the at least one sensor, and in particular by means of the at least one movable element of the sensor that is displaced due to the contact with at least a part of a passenger's body. As described above, the contact with the movable element of the sensor can be obtained directly with the passenger's body, or indirectly by means of press element, for example upon a relative movement between the restraint element and the movable bar, as described above. The detection of the contact between the restraint element and the passenger's body can be carried out by the deactivation of the sensor, while the sensor is activated when there is no contact between the passenger's body and the restraint element.

Advantageously, the method comprises the step of generating at least one signal by means of the at least one sensor when the latter detects the contact of the restraint element with at least one part of the passenger's body such as the thighs and/or the upper part of the thighs or abdomen. The signal generated by the sensor can be processed by a suitable control unit of the restraint device and can be used in different ways.

The method comprises the step of activating, and the step of giving permission to activate the locking means of the at least one movable bar to lock its movement when the at least one sensor has detected that a restraint element is in contact with a passenger. In this case the signal generated by the sensor after the detection of the contact between the restraint element and the passenger is used to give permission to a control system (or control unit) to activate the locking means of the movable bar.

However the signal generated by the sensor can be used to activate visible or acoustic indicators showing that the restraint device has reached the closed position by contacting the passenger thus ensuring an effective retention of the latter.

The at least one sensor can be arranged in such a way that the contact of the movable element of the sensor with the passenger (either directly or indirectly) activates the sensor to generate a signal, as described above. However, the sensor can be arranged so that the movable element of the sensor is pressed when there is no contact between the restraint element and the passenger's body. By doing so, the contact of the passenger's body with the restraint element allows to release the pressure on the sensor, and in particular on its movable element, and therefore the contact with the passenger can be detected because the sensor is no longer activated, i.e. the movable element of the sensor is no longer pressed, either directly or indirectly, by the passenger's body.

The present invention also relates to a vehicle for an amusement ride, comprising at least one seat for one or more passengers.

Further features and aspects of example embodiments of the present invention are described in more detail with reference to the appended Figures.

BRIEF DESCRIPTION OF THE DRAWING

FIGS. 10a and 10b are two views of an embodiment of a restraint device provided with an empty sensor;

FIG. 11a illustrates a part of a seat that is movable with respect to a fixed part to detect a presence of a passenger;

DETAILED DESCRIPTION

Figure 1:
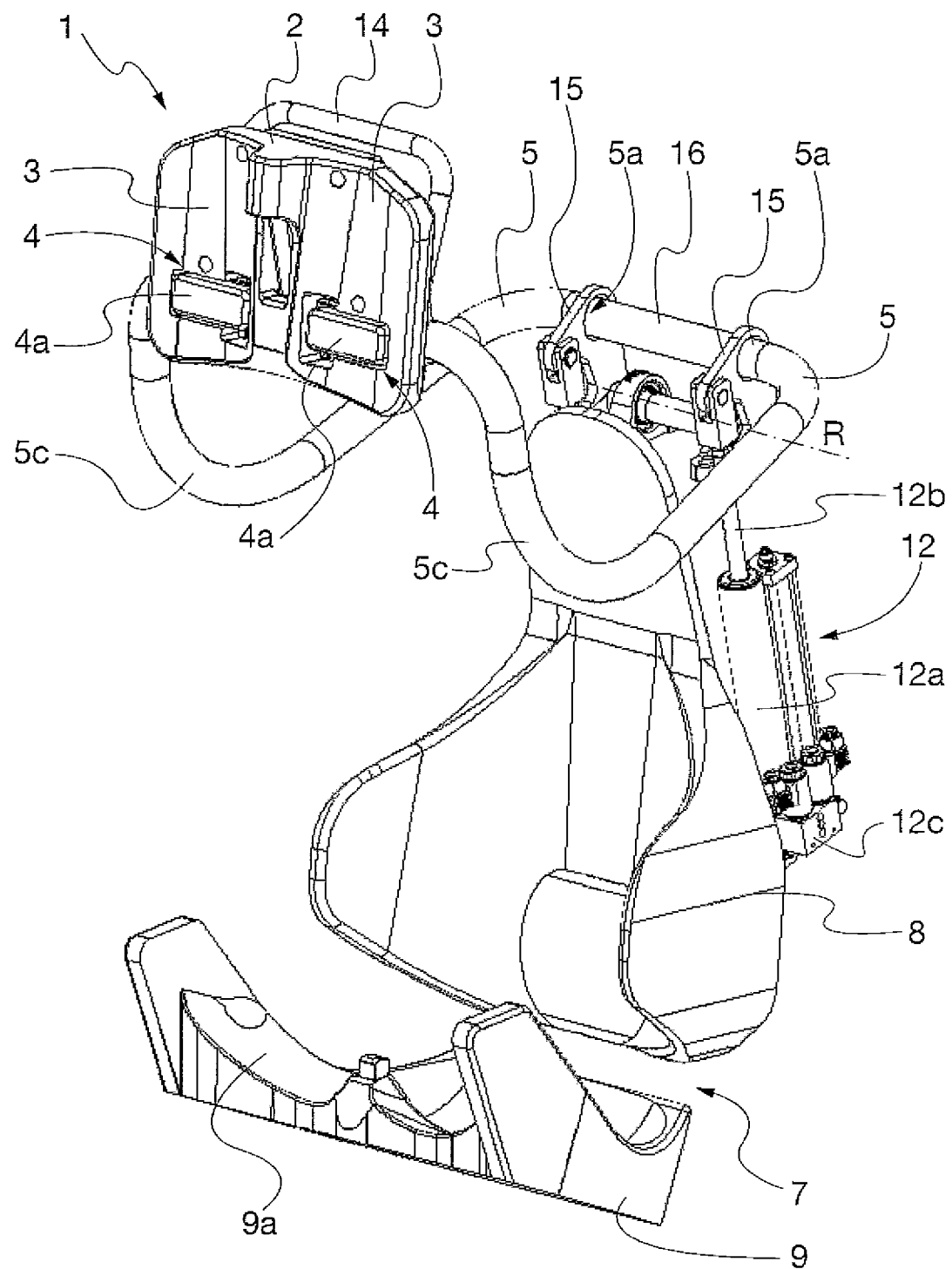
FIG. 1 is perspective view of an embodiment of a restraint device in an open position.

Other features, advantages and details appear, by way of example only, in the following detailed description of embodiments.

With reference to the attached Figures, the passenger restraint device 1 for amusement rides comprises at least one restraint element 2 provided with at least one contact surface 3 intended to be brought into contact with at least one part 11 of the body of a passenger 6.

The restraint device 1 further comprises at least one moveable bar 5 to which the at least one restraint element 2 is constrained. In the embodiment shown in the Figures, the restraint element is constrained in correspondence of one end 5b of the movable bar 5. However, different arrangement of the constraining point or area of the restraint element 2 to the at least one movable bar 5 can be provided according to embodiments.

The restraint element 2 can be constrained to the at least one movable bar 5 in a rotatable manner, for example, element 2 is pivotally mounted on the bar. In other words, the at least one restraint element 2 is pivotally constrained to the at least one movable bar 5, and preferably the restraint element 2 can be rotated with respect to the at least one movable bar 5 of an angle β equal to or less than 30°, and more preferably equal to or less than 20°. This configuration increases the adaptability of the restraint device 1 according to the invention to retain passenger of different sizes.

The restraint element 2 can be freely rotatable with respect to the at least one movable bar 5, thus the relative position of these elements can be adapted in order to obtain an effective contact of the restraint element 2 with the passenger's body independently from the dimension and the percentile value of the body of the passenger, i.e. independently from the size of the passenger. Due to the rotation of the restraint element with respect to the bar, the restraint element can always be positioned in such a way as to fully contact the body, usually the upper thighs and lower abdomen, of the passenger.

As it will be discussed in the following with reference to FIGS. 12 to 16, according to an embodiment the movement, and in particular the rotation, of the restraint element 2 with respect to the movable bar 5, due to the contact with at least a part of the passenger's body 6, allows the detection of the contact with a passenger by means of at least one sensor 4.

In fact, by means of the rotation movement of the restraint element 2 with respect to the at least one movable bar 5, the restraint element 2 can be oriented in such a way that it is parallel with respect to the plane passing through, or the plane substantially defined by, the part 11 of the passenger's body to be contacted.

In other words, as discussed below, the restraint element 2, and in particular its at least one contact surface 3, can be parallel to the plane defined by at least one part 11 of the passenger's body to be contacted, thanks to the rotation movement of the restraint element 2 with respect to the at least one movable bar 5.

Figure 4:
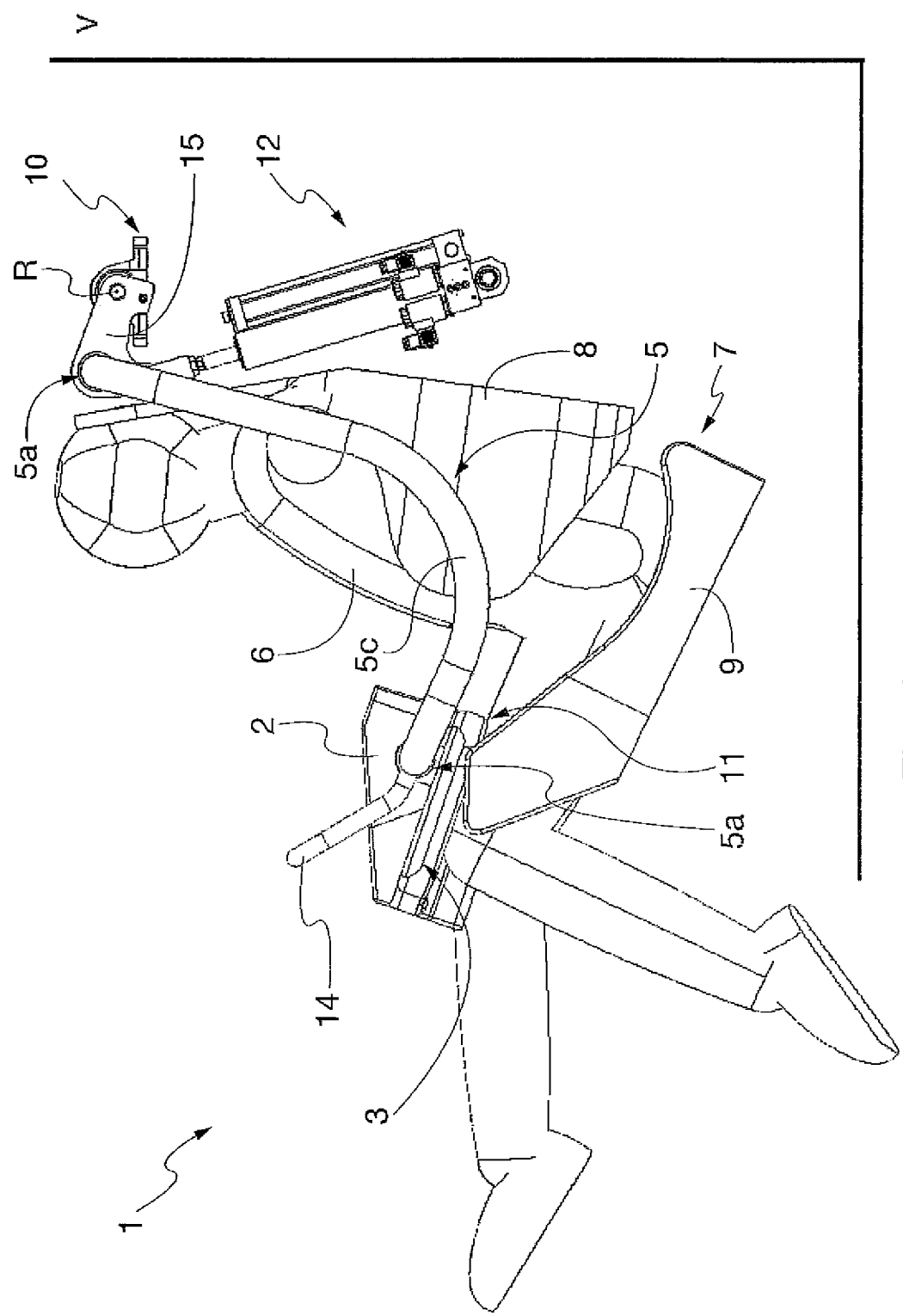
FIG. 4 is a lateral view illustrating the restraint device in the closed position to retain a passenger.
Figure 4A:
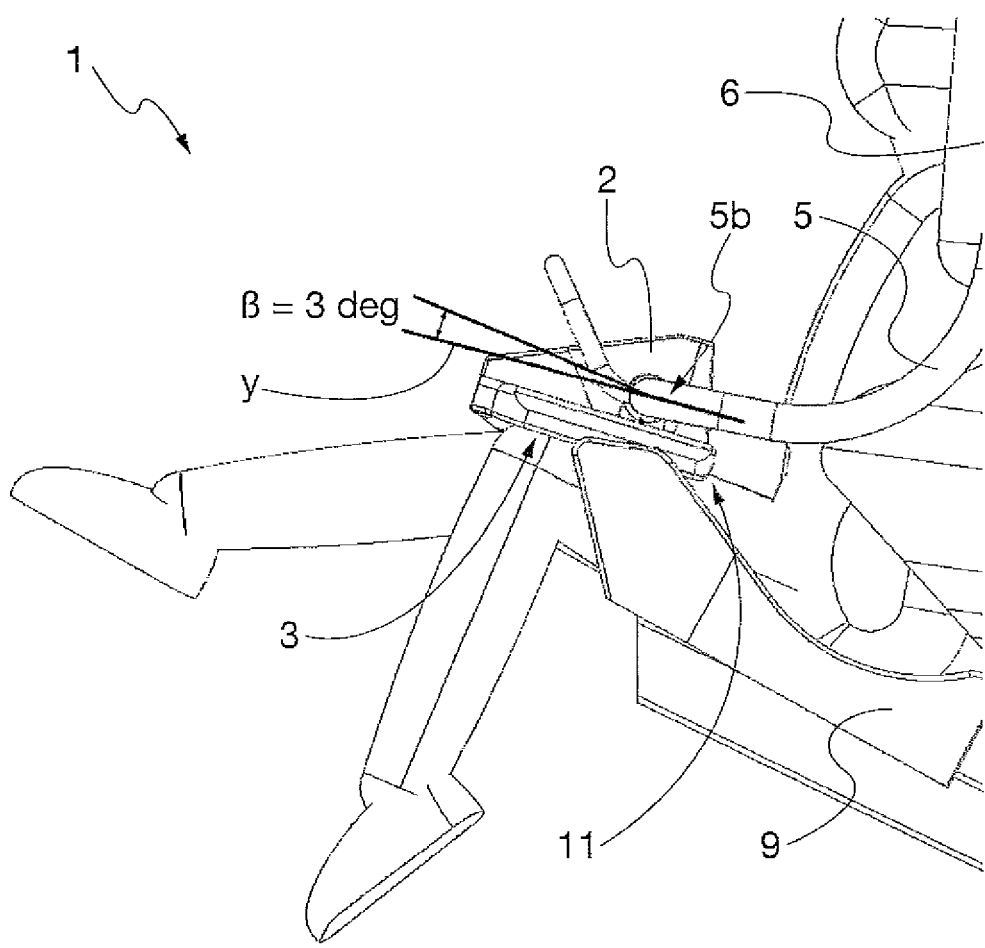
FIG. 4A is an enlarged lateral view of an embodiment of a restraint device in a closed position to retain an adult passenger with the restraint element rotated with respect to a movable bar.
Figure 5:
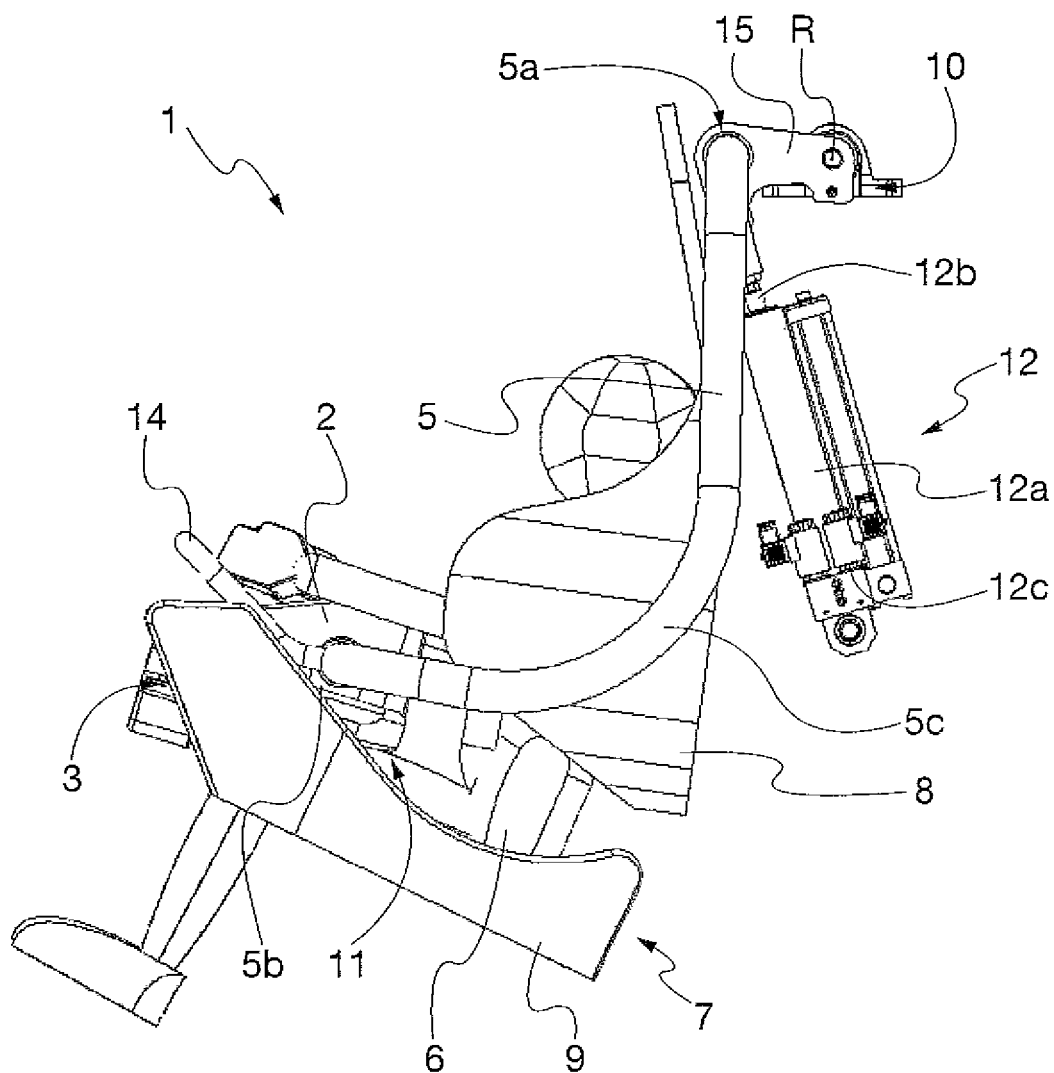
FIG. 5 illustrates the retention of a small size passenger by means of a restraint device.
Figure 5A:
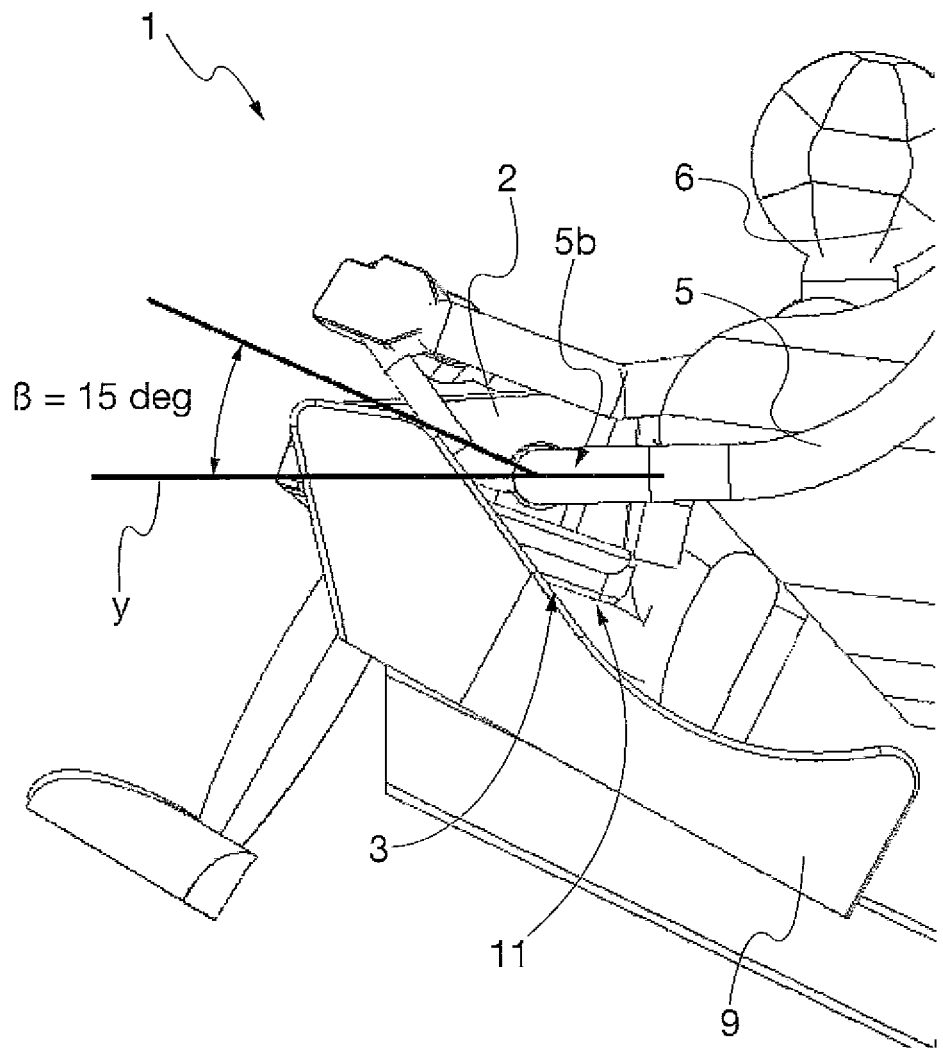
FIG. 5A is an enlarged lateral view of an embodiment of a restraint device in a closed position to retain a small size passenger with the restraint element rotated with respect to a movable bar.

The rotation angle β of the restraint element 2 with respect to the at least one movable bar 5 is preferably measured from a reference plane Y (see FIGS. 4A and 5A). According to an embodiment, the rotation angle β of the restraint element 2 with respect to the at least movable bar 5 is measured between a reference plane Y and the contact surface 3 of the restraint element, as shown in FIGS. 4A and 5A. According to an embodiment, as shown in FIGS. 4A and 5A, the reference plane Y, from which the rotation angle β is measured, is a plane passing through, or parallel to, the end portions 5b of the at least one movable bar 5.

Figure 2:
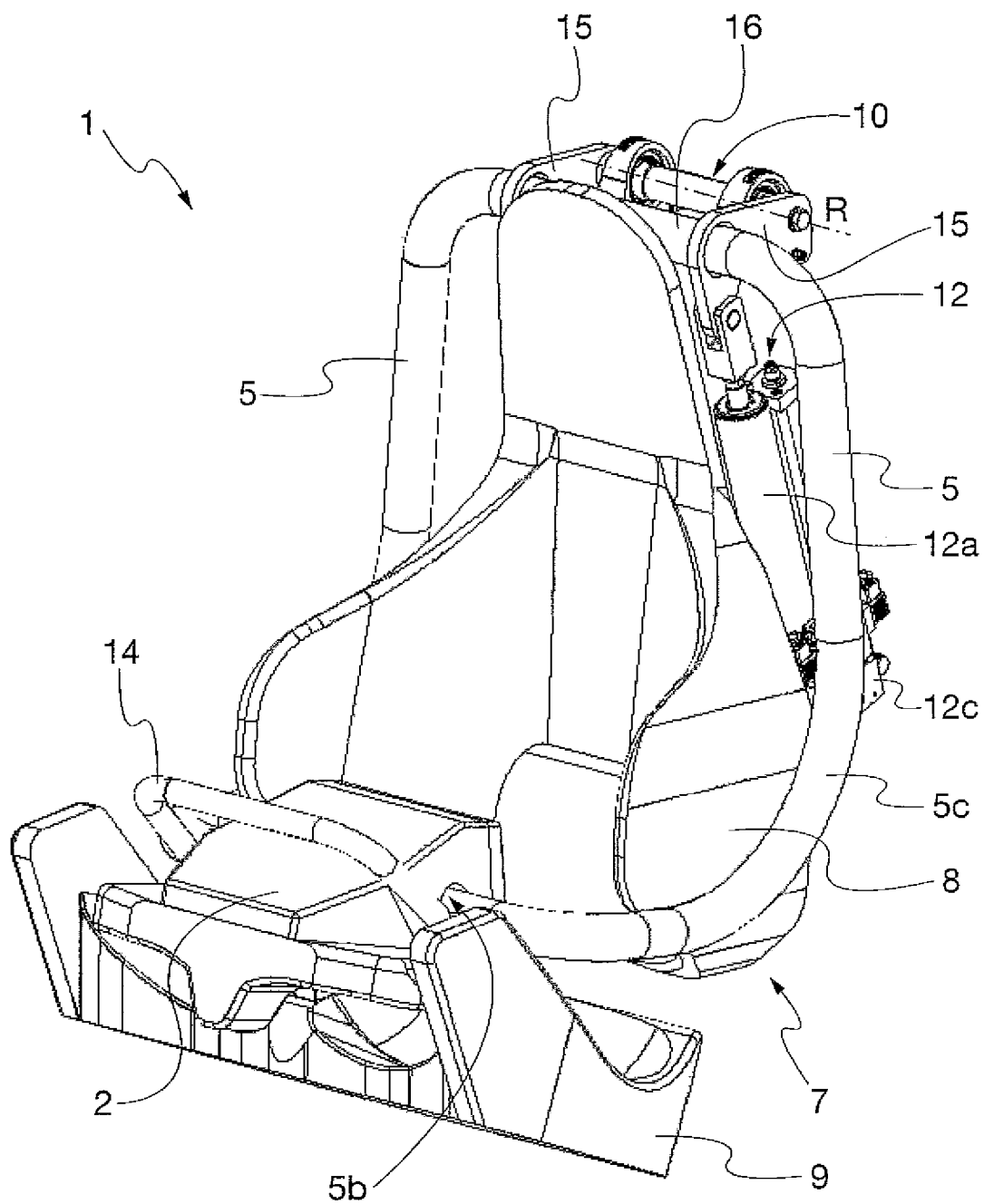
FIG. 2 is perspective view of an embodiment of a restraint device in a closed position.

The at least one restraint element 2, and in particular the at least one moveable bar 5 to which the restraint element is constrained, is movable from at least one open position, shown in FIG. 1, in which the restraint element 2 is away from the passenger that is not contacted by the restraint element 2, to at least one closed position, shown in FIG. 2 (without a passenger), 4 and 5.

In the closed position the restraint element 2, and in particular its contact surface 3, is in contact with at least one part of the body of the passenger 6.

Figure 3:
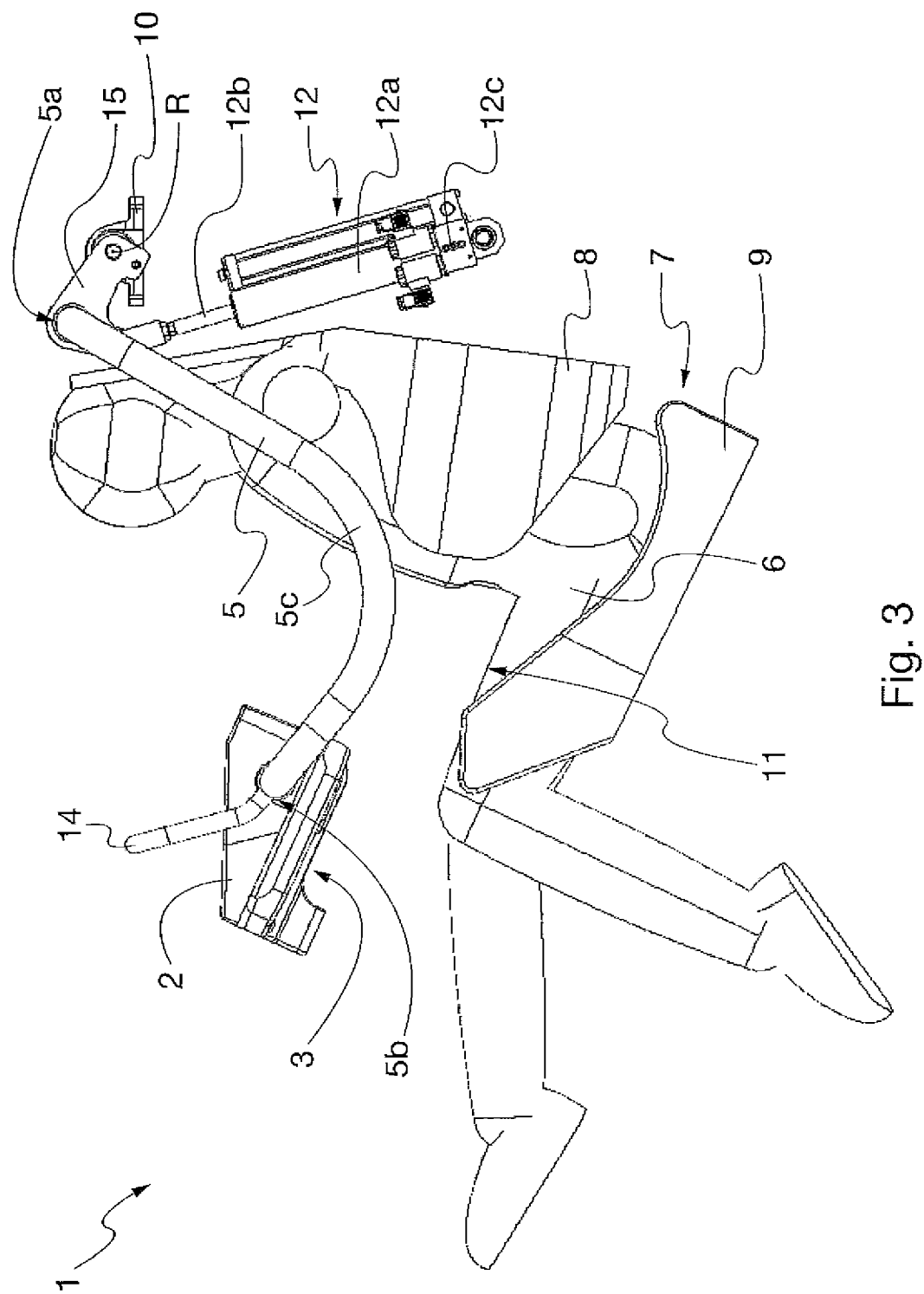
FIG. 3 is a lateral view illustrating the restraint device during movement towards the passenger.

The at least one closed position of the restraint element can be reached by moving the restraint element 2 from the at least one open position towards the passenger 6, as shown in FIG. 3 wherein the restraint element 2 is shown in an intermediate position between the open position of FIG. 1 and the closed position of FIGS. 4, 4A, 5 and 5A.

As described above, the movement of the movable bar 5 in order to cause the displacement of the restraint element 2 from the at least one open position towards the passenger in order to reach at least one closed position, can be obtained by manually operating the at least one movable bar or automatically by suitable moving means known in the art.

In the embodiment shown in FIGS. 1 to 7, the at least one contact surface 3 is arranged on the bottom of the restraint element 2, and preferably it is intended to be brought in contact with the thighs 11 of a passenger's body 6, as shown in FIGS. 4, 4A, 5 and 5A.

Figure 10A:
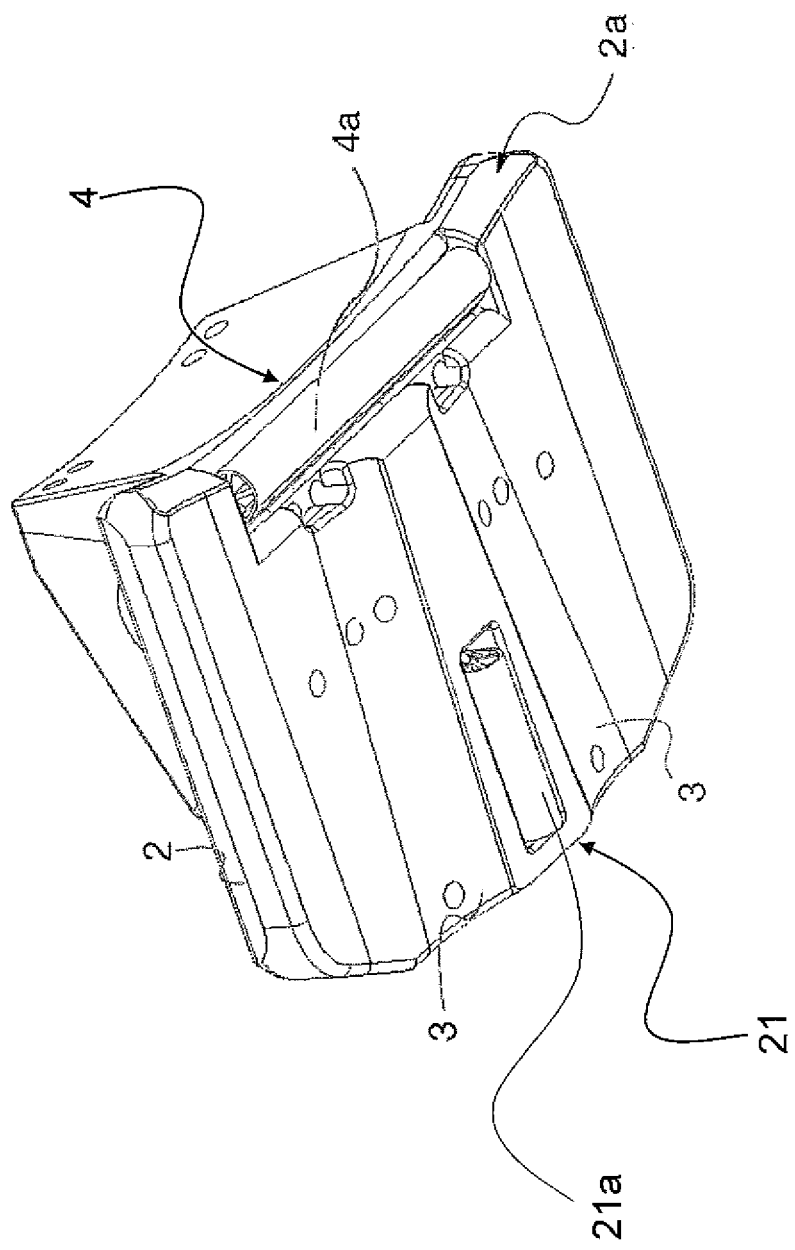

In the embodiment shown in FIGS. 10a and 10b, the at least one contact surface 3 is arranged on the bottom of the restraint element 2 and also at least in part on the lateral surface 2a of the restraint element 2, and preferably it is intended to contact the upper thighs 11 and/or the abdomen of a passenger's body 6.

In the embodiment shown in FIGS. 12 to 16, the least one contact surface 3 is arranged on the bottom of the restraint element 2 and also at least in part on the lateral surface 2a of the restraint element 2. The contact surface is intended to contact the upper thighs 11 and/or the abdomen of a passenger's body 6. According to an embodiment, as for example shown in FIGS. 12 to 16, the rear lateral surface 2a of the restraint element 2 is inclined in order to allow the contact with the abdomen of passengers of different sizes, and to allow the rotation of the restraint element 2 with respect to the movable bar 5.

Preferably, the rear lateral surface 2a is inclined with respect to an horizontal plane passing through the bottom surface of the restraint element 2, in other words, the rear lateral surface 2a is not perpendicular with respect to an horizontal plane substantially identified by the bottom surface of the restraint element 2.

Advantageously, the restraint element is designed to have a substantially pad-like shape, i.e. it is provided with a substantially flat contact surface 3 intended to be brought in contact with the passenger. In other words, the at least one contact surface 3 of the restraint element 2 is substantially flat or slightly shaped to conform to the thighs. Additionally, as shown in the Figures, the restraint element 2 is provided with a handle 14.

In the embodiment shown in the FIGS. 1 to 7, 10a, 10b, and 12 to 16 the restraint element 2 is pad-shaped and it is adapted to be placed on at least one part of the thighs 11 of the passenger 6 with the aim of restraining him during the ride. This solution permits secure fixing of people of differing stature and gives a feeling of movement which is as free as possible, thereby enhancing the experience of movement during the ride. The contact surface 3 can be shaped in an anatomic manner with the thighs of the passenger 6.

In particular, in the embodiment shown in FIGS. 10a and 10b, the contact surface 3 also extends at least in part in correspondence of the rear lateral surface 2a of the restraint element in order to contact the abdomen of the passenger 6. Additionally, the rear lateral surface 2a con be inclined in order to contact the abdomen of a passenger and to cause a rotation of the restraint element 2 with respect to the movable bar 5, as for example in the embodiment shown in FIGS. 12 to 16.

As described above, thanks to the rotation movement of the restraint element 2 with respect to the at least one movable bar 5, the contact surface 3 of the restraint element 2 can be brought in an effective contact position with the plane defined by the thighs 11 of the passenger and/or with the abdomen of the passenger, even with passengers of different sizes, as shown for example in FIGS. 4A and 5A. In the contact position shown in FIGS. 4A and 5A, the restraint element 2, and in particular its contact surface 3, is parallel with respect to the plane defined by the thighs 11 of the passenger.

In the embodiment of FIG. 4A an adult passenger 6 is effectively retained by the restraint element 2 that is in contact with the thighs 11 of the passenger due to the rotation of the restraint element 2 with respect to the movable bar 5 of an angle β of about 3°. In this configuration, as shown in FIG. 4A the restraint element 2, and in particular its contact surface 3 is parallel with the plane defined by the thighs 11 of the passenger.

In the embodiment shown in FIG. 5A, a small size passenger is also effectively retained by means of the restraint element 2. In fact, the restraint element 2, and in particular its contact surface 3, can be rotated with respect to the movable bar 5 to reach a position where it is parallel with respect to the plane defined by the thighs 11 of the passenger.

As shown in FIG. 5A, a small size passenger 6 is effectively retained by the restraint element 2 that is in contact with the thighs 11 of the passenger because of the rotation of the restraint element 2 with respect to the movable bar 5 of an angle β of about 15°.

Even if a specific reference has been made to the thighs 11 of a passenger, the restraint device according to the invention is not limited to such use, and the restraint element 2 and its contact surface 3 can be shaped and moved to contact other parts of the passenger's body. In the embodiment shown in FIGS. 10a and 10b, the restraint element 2 can be brought in contact with the upper thighs and at least part of the abdomen of the passenger 6. In particular, the at least one sensor 4 is substantially arranged in the rear part of the restraint element 2 and it is intended to contact the thighs 11 and/or the abdomen of the passenger 6. The at least one sensor 4 is provided with a rounded movable part 4a, arranged in correspondence of the corner between the bottom surface and the rear lateral surface 2a of the restraint element 2.

Also in the embodiment shown in FIGS. 12 to 16 the restraint element 2, and in particular its rear lateral surface 2a, is designed to contact the thighs 11 and/or the abdomen of the passenger 6.

In fact, the restraint device 1 according to the present invention, and also the seat 7 according to the invention that will be described below, can be applied to several kinds of amusement rides and in particular in several kinds of vehicles V for amusement rides. In general it can be used in all amusement rides in which there is the need of securing the passenger in order to avoid the latter to be subjected to undesired and dangerous movements.

The attached Figures show an embodiment of the present invention, preferably used in a vehicle V (schematically shown in FIG. 4) of an amusement ride provided with at least one seat 7 where at least one passenger 6 can be seated, as for example in a roller coaster. As it will be disclosed later, the at least one seat 7 can be provided with at least one sensor 20, 21, 25 intended to detect the presence of a passenger on the seat 7.

The restraint device according to the invention can be used in different types of amusement ride with different configuration of vehicle and/or seat to retain the passengers.

Advantageously, the restraint device 1 according to the invention comprises at least one sensor 4, to detect a contact between the restraint element 2 and at least one part 11 of a passenger's body 6. In the embodiment shown in the Figure, the at least one sensor 4 is a contact sensor. According to an embodiment the sensor 4 intended to detect the contact with the passenger is a contact switch sensor.

As described above, the expression "contact switch sensor" is used herein to indicate a sensor that is able detect the contact with at least part of the passenger 6 that causes the direct, or indirect, displacement of at least one movable element 4a of the sensor.

According to an embodiment, sensor 4 is a biased contact sensor (and preferably a biased contact switch sensor), for example a "push-button" type sensor, wherein the displacement of a movable element 4a of the sensor is biased by an elastic element 4b.

Advantageously, the correct contact position of the restraint element 2 with the passenger is detected by means of the sensor 4. In particular, the restraint device according to the invention is able to detect if the passenger leaves a gap between himself and the restraint element 2.

Figure 6:
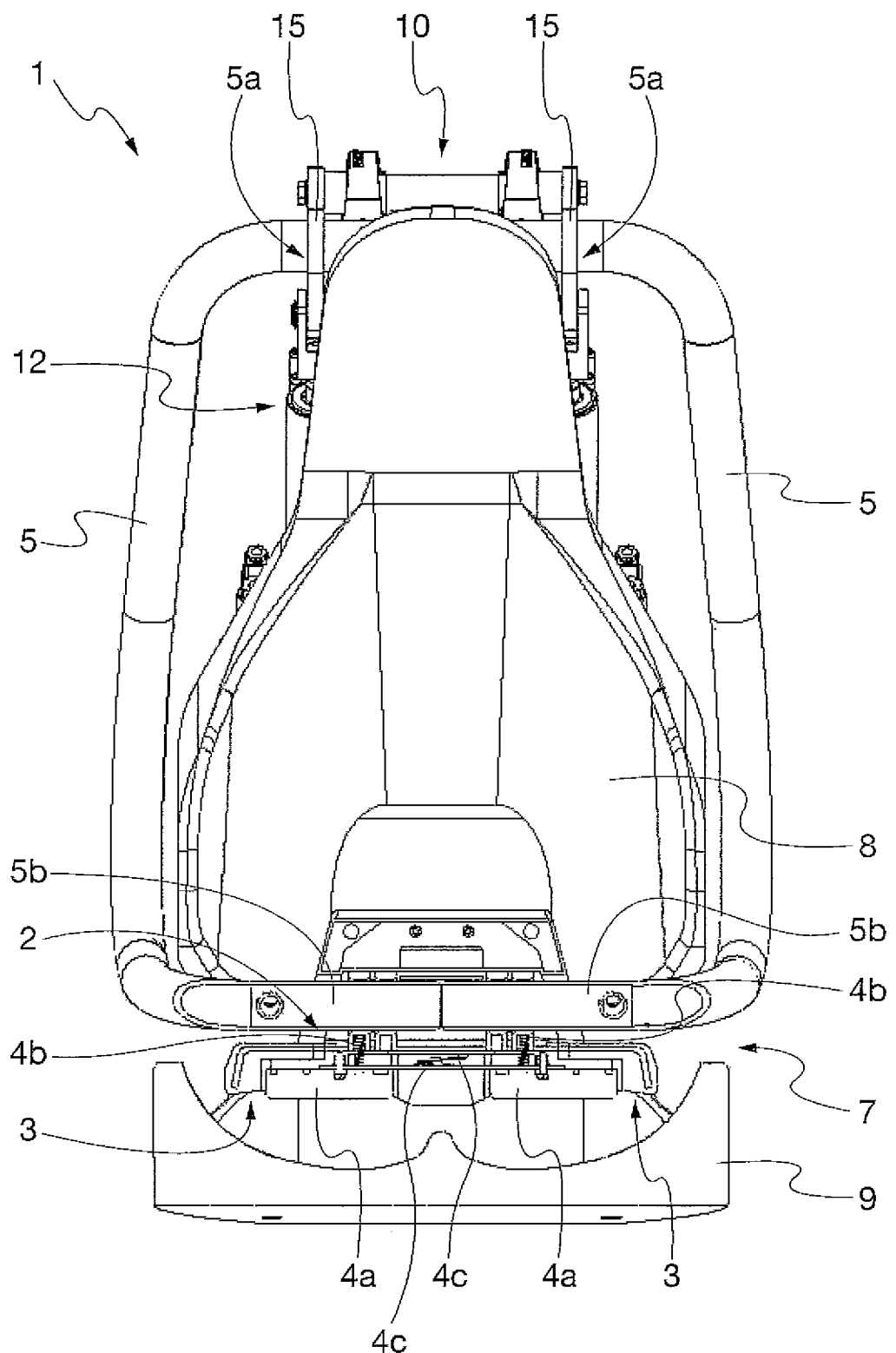
FIG. 6 is frontal section view of a restraint element of a restraint device.
Figure 7:
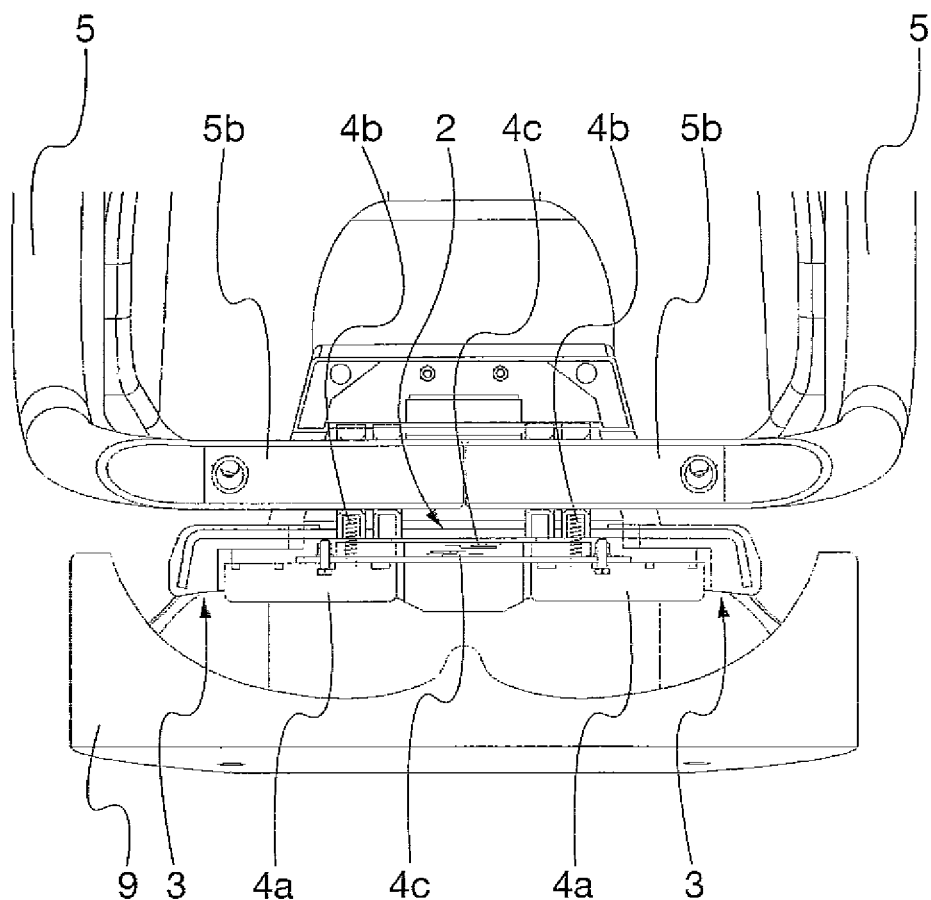
FIG. 7 is an enlarged view of a restraint element illustrated in FIG. 6.

As shown in sectional views of FIGS. 6 and 7, according to an embodiment of the present invention the at least one sensor 4 comprises at least one movable element 4a that is intended to be displaced by the contact with at least one part of the body of the passenger 6.

Figure 12:
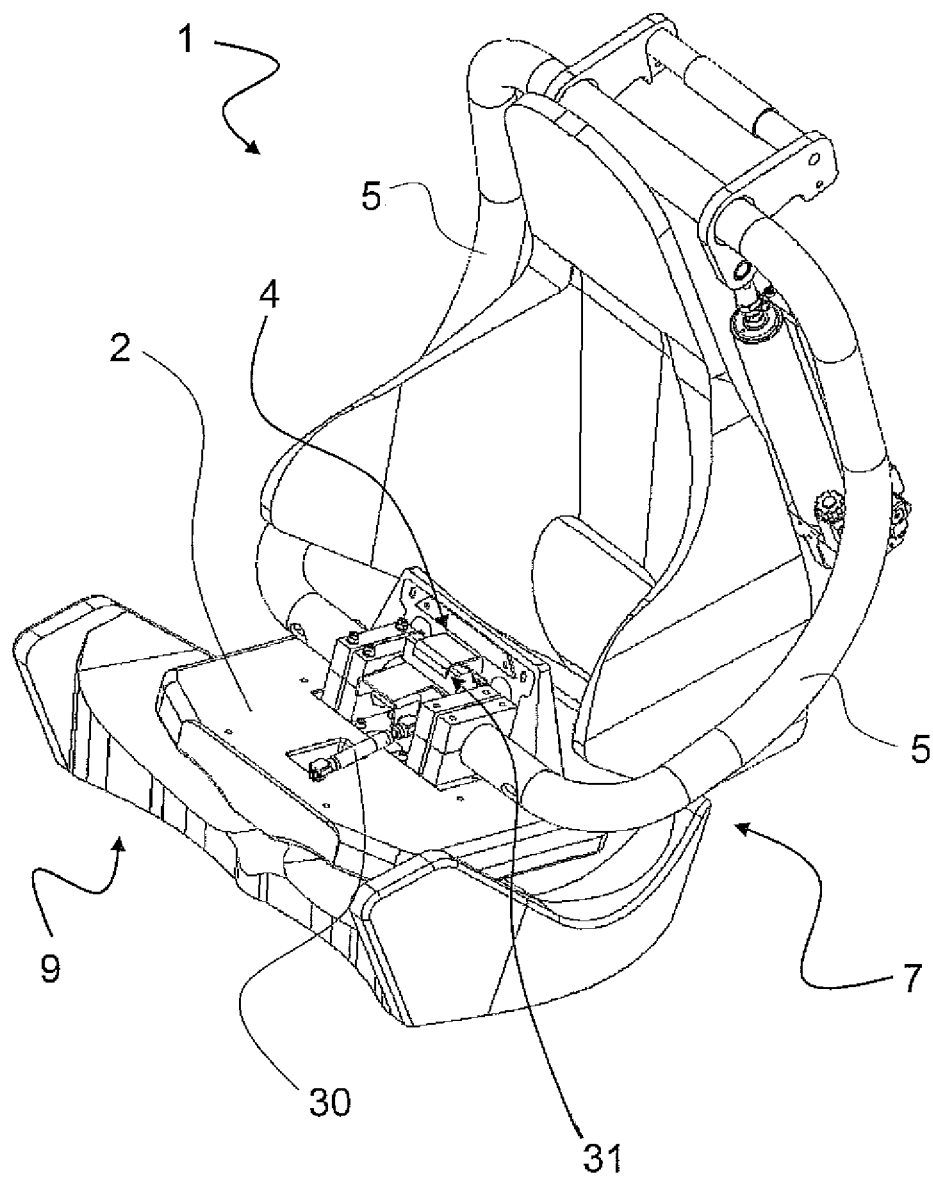
FIG. 12 is a perspective view of an embodiment of a restraint device.
Figure 13:
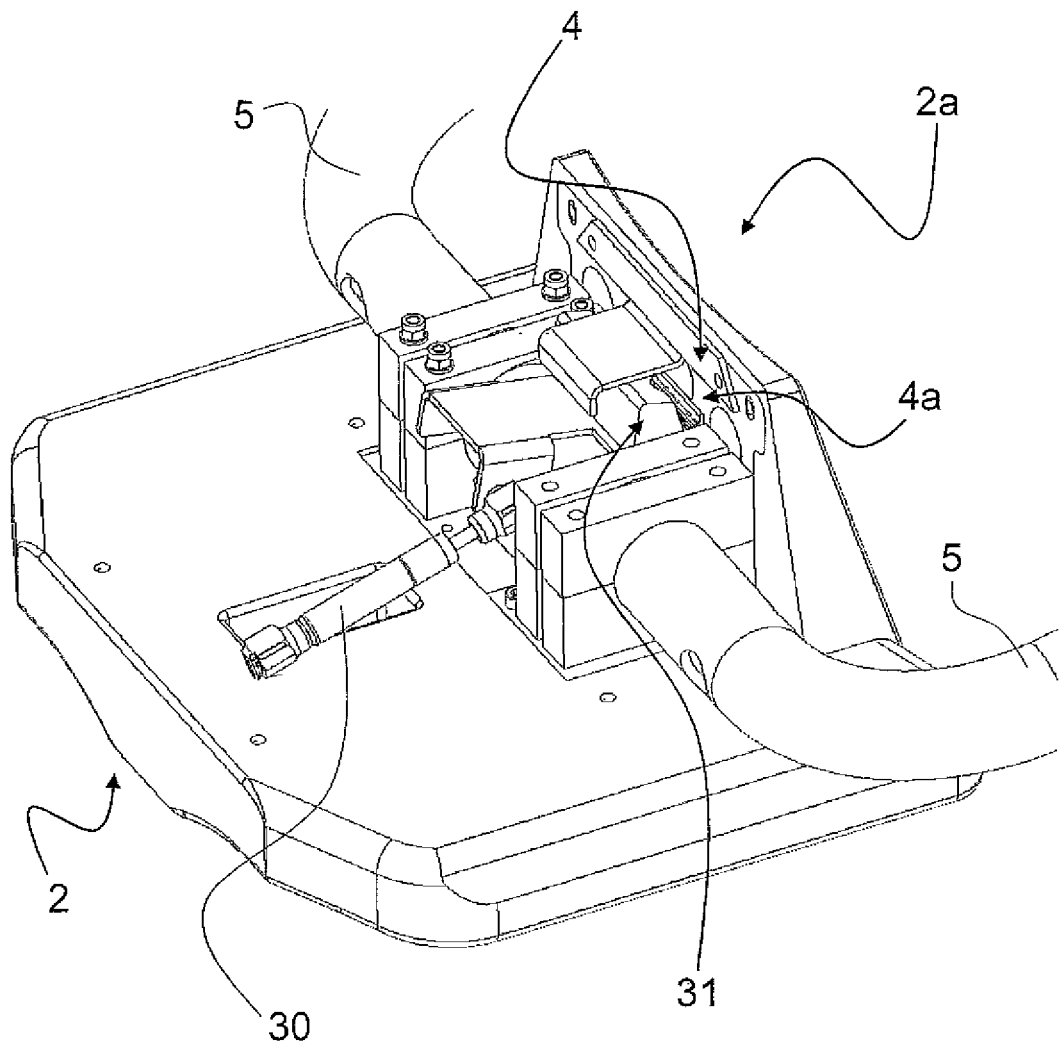
FIGS. 13 and 14 are two enlarged views of the restraint device illustrated in FIG. 12, respectively shown in a contact position with a passenger and a non-contact position with the passenger's body.
Figure 14:
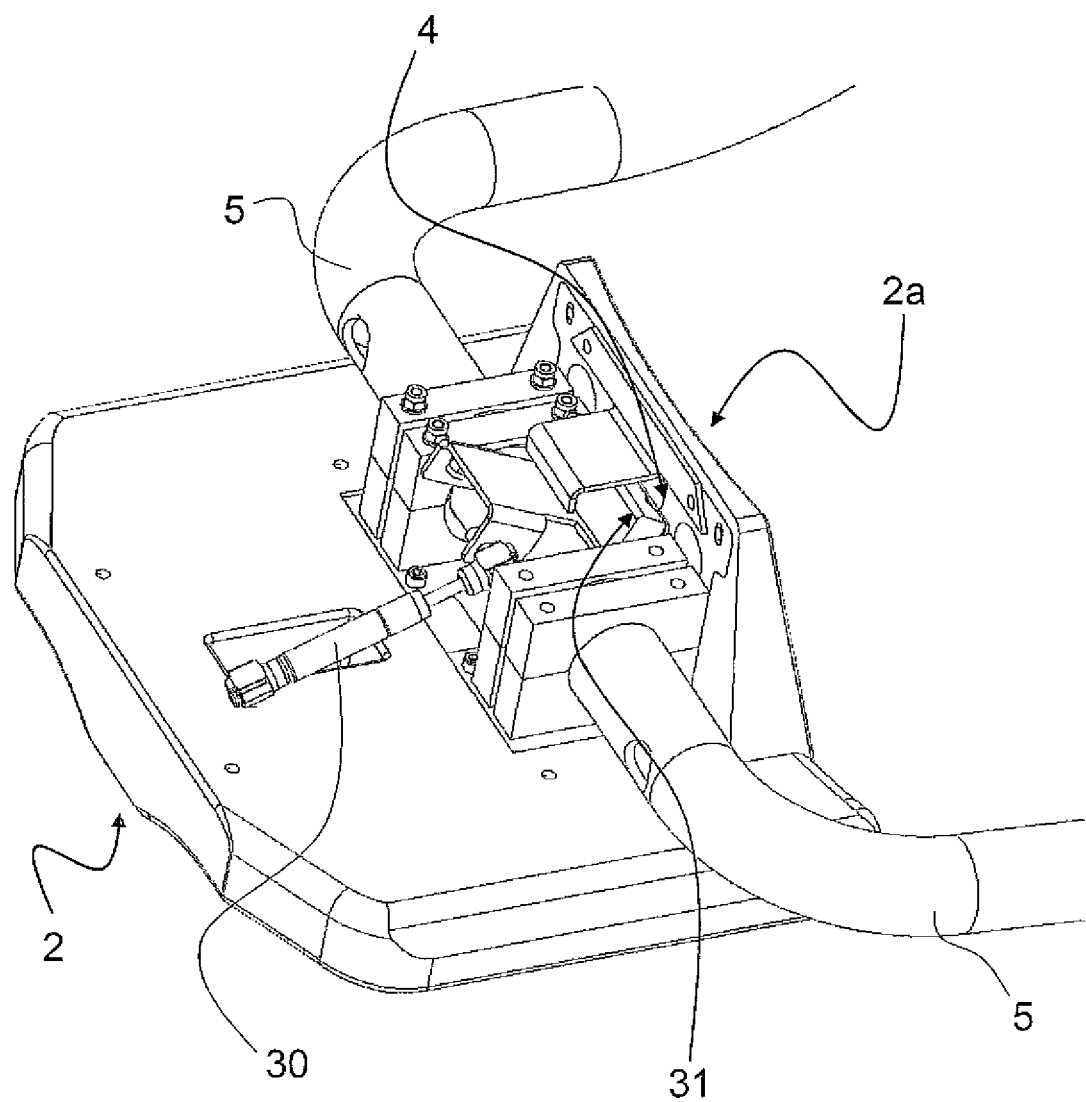

As described above, the movable element 4*a* of the sensor can be directly or indirectly contacted by the passenger, i.e. the movable element 4*a* can be arranged on an external surface of the restraint element 2, so that it can be contacted directly by the passenger's body, or it can be arranged within the restraint element 2 so that it can be contacted indirectly, preferably by means of a press element 31 (as for example in the embodiment shown in FIGS. 12 to 14).

The movable element 4*a* of the sensor 4 can be arranged within the surface of the restraint element 2 at least in part protruding from the restraint element 2, and in particular protruding from the contact surface 3 of the restraint element 2, as for example shown in the embodiments of FIGS. 1 to 7, 10*a* and 10*b*. According to another embodiment, the sensor 4 and the at least one movable element 4*a* are arranged within the restraint element 2, and in particular in correspondence of the rear part of the restraint element 2, as for example in the embodiment shown in FIGS. 12 to 16. The embodiment shown in the FIGS. 1 to 7 comprises two sensors 4 provided with a movable element 4*a* that protrudes from the contact surface 3 of the restraint element 2, see in particular the section view of FIGS. 6 and 7.

In the embodiment shown in FIGS. 10*a* and 10*b*, one sensor 4 is arranged substantially in correspondence of the rear part of the restraint element 2, and it is provided with a movable element 4*a* arranged perpendicularly with the thighs of the passenger 6 to be contacted. As visible in these FIGS. 1 to 7, 10*a* and 10*b*), the movable element 4*a* of the sensor 4 is movable with respect to the restraint element 2, and in particular with respect to the contact surface 3 of the restraint element 2, when contacted by the passenger 6.

The embodiment shown in Figures is preferably provided with two sensors 4, however this configuration does not exclude further embodiments which provide a different number or kind of sensors 4. In the embodiment shown in FIGS. 10*a* and 10*b*, there is a single sensor 4 arranged in the rear part of the restraint element 2, and in particular in the rear part of the contact surface 3, i.e. at the edge of surface 3 that is closer to the passenger. More than one sensor 4 may be provided, but a single sensor 4 is preferred.

This arrangement allows contacting the passenger in an efficient manner, in fact, secure restraint of passengers of different sizes can be efficiently detected by contacting the thighs 11 and/or the abdomen. The operation of the sensor 4 arranged on the rear part of the restraint element 2, and in particular on at least part of the lateral 2*a* surface of the restraint element is the same as of the sensor 4 described above in connection to the FIGS. 1 to 7, wherein the sensor 4 is arranged on the bottom surface of the restraint element 2. The sensor 4 comprises one or more elastic elements 4*b*, for example made by one or more spring, that maintain at distance electric contacts 4*c* of the sensor 4. When the movable element 4*a* is displaced due to the direct, or indirect, contact with the passenger the, electric contacts are coupled.

In general, an electrical signal can be generated by the sensor 4. The signal indicates that the contact with the passenger's body by the restraint element is achieved and the restraint element has reached the closed position in which it can effectively retain the passenger.

The generated signal from the sensor can be processed by a suitable control unit of the restraint device, not shown, and can be used in different ways according to embodiments of the invention. As will be disclosed below, the signal generated by the sensor 4 can be used to activate permission at the control system (control unit) for locking means of the movable bar 5 in order to lock the restraint element 2 in the closed position during the ride.

In the embodiment shown in FIGS. 12 to 16, the restraint element 2 is rotatable (pivotally constrained) with respect to the at least one movable bar 5 and the at least one sensor 4, arranged on the restraint element 2, is movable with respect to a press element 31 fixed on the bar 5.

Even if the at least one sensor 4 is shown arranged on the restraint element 2, according to an embodiment, not shown in the Figures, the sensor 4 can be fixed on the movable bar 5, and the press element 31 can be fixed on the restraint element 2.

Figure 15:
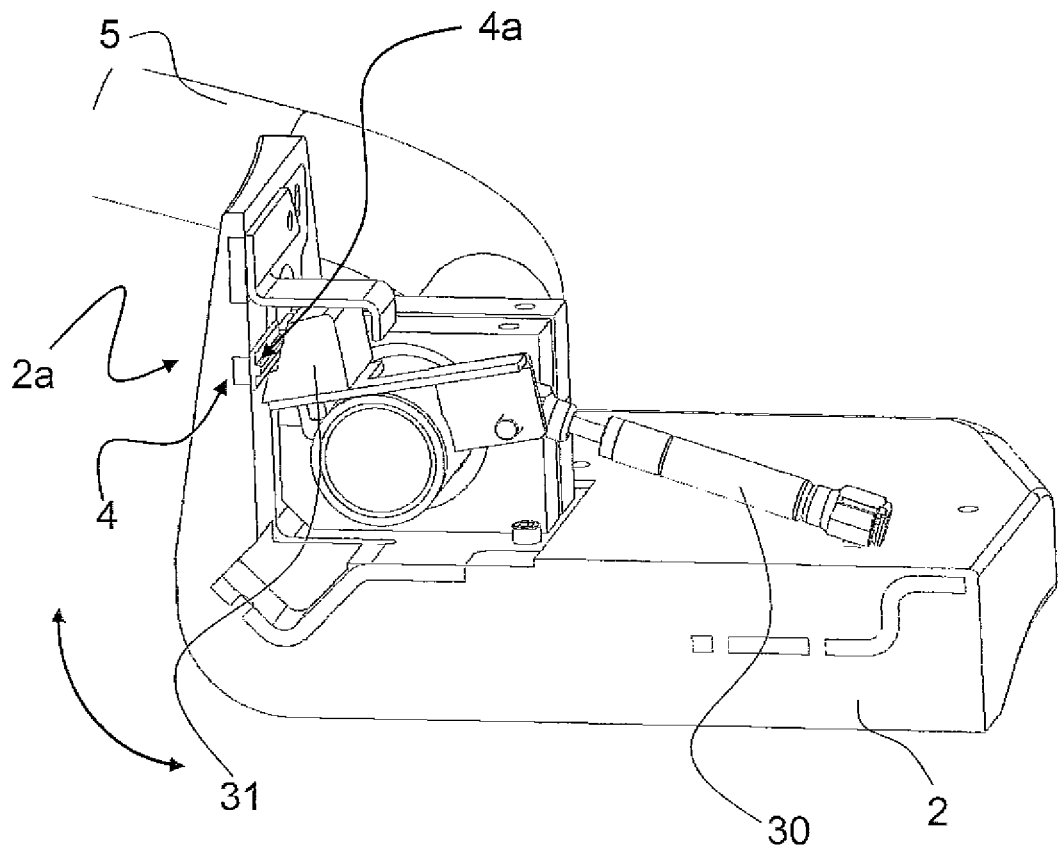
FIGS. 15 and 16 show two detailed section views of the restraint device respectively illustrated in FIGS. 13 and 14.
Figure 16:
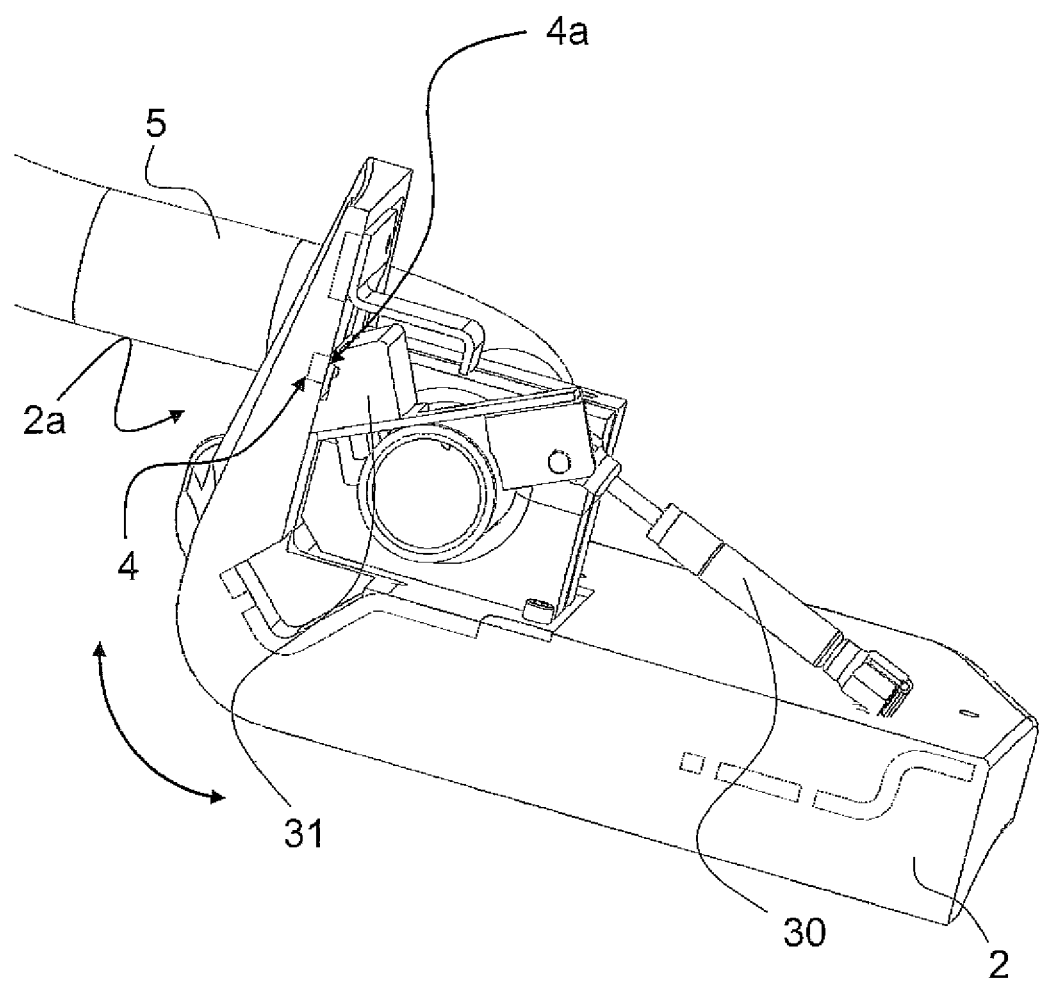

In the embodiment shown in FIGS. 12 to 16, biasing means 30, preferably at least one elastic element for example in the form of a gas spring, is provided to maintain the restraint element 2 in the position wherein the sensor 4 is contacted by the press element 31, i.e. in a position wherein the press element 31 is in contact with the movable surface 4*a* of the sensor 4. This position is shown in FIGS. 14 and 16, wherein the restraint element 2 is not contacting the passenger's body and the elastic element 30 is not deformed and it is exerting a force intended to maintain the restraint element 2 in a tilted position. In this position, the press element 31 is contacting the sensor 4 and in particular its movable element 4*a*. The elastic element 30 is constrained at one end to the movable bar 5 and at the other end it is acting on the restraint element 2.

When restraint element 2 is brought into contact with at least a part of the passenger's body, for example the thighs 11 and/or the abdomen, the restraint element 2 is rotated with respect to the at least one movable bar 5 (in a counter-clockwise manner in the embodiment shown in FIGS. 12 to 16).

The rotation of the restraint element 2 with respect to the movable bar 5, caused by the contact with the passenger, i.e. by a force or a pressure exerted due to the contact between the passenger's body and the restraint element 2, allows compression of the biasing means 30 and separates the press element 31 and the sensor 4. The sensor is no longer activated, i.e. the movable element 4*a* of the sensor 4 is no longer pressed. Thus, the contact of the restraint element with the passenger's body can be detected because the sensor 4 is no longer activated.

In this position, as shown in FIGS. 13 and 15, the press element 31 is no longer in contact with the sensor 4 of the restraint element and therefore the contact with the passenger can be detected by the deactivation of the sensor 4.

In the embodiment shown in FIGS. 12 to 16, when the restraint element 2 does not contact the passenger's body, the sensor 4 is activated because the press element 31 exerts a force on the movable element 4*a* of the sensor 4 able to couple the electric contacts of the sensor (not shown).

However, when the passenger's body is contacted, the restraint element 2 rotates with respect to the movable bar 5 and the press element 31 and the sensor 4 are maintained at distance, as shown in FIGS. 13 and 15, so that the signal is not generated and the contact with the passenger can be detected by the deactivation of the sensor.

The operation of the sensor 4 of the embodiment shown in FIGS. 12 to 16 is substantially opposite to the operation of the sensor 4 of the embodiments of FIGS. 1 to 7, 10*a* and 10*b*.

In fact, in the embodiment shown in FIGS. 1 to 7, 10*a* and 10*b*, a direct or indirect contact of the passenger's body with the at least one movable element 4*a* of the sensor 4 is used to activate the sensor, for example by coupling the electric contacts 4c of the sensor, and when the restraint element 2 is not contacted by the passenger's body the sensor is not activated.

On the contrary, in the embodiment shown in FIGS. 12 to 16, the at least one sensor 4 is arranged so that the at least one movable element 4a is pressed when the restraint element 2 is not in contact with the passenger's body, for example by at least one press element 31 and the force exerted by the biasing means 30. When the restraint element 2 is contacted by at least part of the passenger's body, the sensor 4 is no longer activated and the movable element 4a is no longer pressed by element 31.

Therefore, the contact of the restraint element 2 with passenger's body can be detected because the sensor is no longer activated. The signal generated by the sensor 4 indicating that the contact with the passenger's body by the restraint element 2 is achieved and that the restraint element has reached the closed position in which it can effectively retain the passenger, is the deactivation of the sensor 4.

The at least one movable bar 5 intended to move the restraint element 2 from the at least one open position towards the passenger 6, is directly or indirectly pivotable about at least one rotation axis R. It has to be noticed that according to other embodiments, the movement of the movable bar 5, can also be provided as only a translation movement, or a combination of a rotational movement about an axis and of a translation movement.

The expression "directly or indirectly pivotable" is hereby used to indicate that the at least one movable bar, and in particular one of its end, can be rotated directly about an axis R, or the rotation movement can be obtained by means of a kinematic link or connection 15, 16 to a rotation axis R, as shown in the Figures.

As described above, the at least one passenger 6 can be retained in one or more seats 7, as in the embodiment shown in the Figures, and the rotation axis R of the at least one movable bar 5 can be arranged in the upper or in the lower part of the passenger seat. In other words, the rotation axis R around which the movable bar can be displaced from the at least one open position to at least one closed position, wherein the restraint element is in contact with at least part of the passenger's body, can be arranged substantially above or below the passenger.

For example, movable arm 5 can be rotated about an axis placed on the floor in front of the passenger. According to an embodiment of the present invention, the at least one rotation axis R of the at least one movable bar 5 is arranged substantially on the upper portion of the passenger seat 7, and in particular substantially in correspondence of the upper portion of the backrest 8 of the at least one seat 7.

In the embodiment shown in the Figures, at least one, preferably two moveable bars 5 are constrained in correspondence of the upper part of the backrest 8 of the seat 7. As shown in the Figure, a support frame 10 is arranged preferably in the rear of the backrest 8 of the seat 7.

Each moveable bar 5 comprises a first end 5a pivotally constrained to the support frame 10 and a second end 5b constrained to the restraint element 2, as described above. According to embodiments, a different number of moveable bars 5 and different way to constrain the bars 5 to a support frame 10, or directly to the passenger seat 7, can be provided.

Moveable bars 5 can be moved between at least one opening position as shown in FIG. 1, in which the restraint element 2 is away from the seat 7, thus allowing the passenger to be accommodated in the seat 7, and at least one closed position as showed in FIGS. 2, 4, 4A, 5 and 5A, in which the restraint element 2 contacts at least one part 11 of the passenger's body 6.

The closed position is reached by moving the restraint element 2, from at least one open position in which the restraint element 2 is away from the passenger, towards the passenger 6 as showed in intermediate position of FIG. 3, by rotating the movable bars 5 about the rotation axis R.

In fact, the two movable bars 5 are moved along a substantially circular path, in fact, each moveable bar 5 is provided with an end 5a that is pivotally constrained to the support frame 10 about the rotation axis R. Starting from at least one open position in which the restraint element 2 is away from the passenger 6, and by moving the restraint element 2 towards the passenger 6 moveable bars 5 rotate about the rotation axis R. By doing so, the closed position of the restraint device is reached, in which the restraint element 2 and contacts at least one part of the passenger 6 seated on the seat 7.

As described above, in the closed position passengers of different sizes can be effectively retained. As shown in FIGS. 4A, 5A by means of the rotation of the restraint element 2 with respect to at least one moveable bar 5, the restraint element 2 is oriented in such a way that it is parallel with respect to the plane passing through, or substantially defined by, the part 11 of the passenger's body to be contacted.

Advantageously, the embodiment shown in the Figures, is provided with two moveable bars 5 having a substantially L-shaped; in particular, to achieve this form each bar 5 comprises two ends 5a and 5b, and curved element 5c. By means of this particular configuration, in the closed position, the movable bars 5 do not interfere with possible movement of the upper part of the passenger during the ride, in particular with his arms.

As shown in the Figures, each moveable bar 5 is indirectly rotatable about the pivot axis R, i.e. by means of kinematic connection 15, 16. Each end 5a of the movable bars 5 is firmly fastened to a support bar 16 fixed to two plates 15 that are substantially cam-shaped.

Each cam-shaped plate 15 is constrained in a rotatable manner to the support frame 10, thus a rotation movement around the rotation axis R can be transmitted to the movable arms 5 that are fixed to the support bar 16, which in turn is fastened to the plates 15.

The plates 15 are pivotally fastened to the support frame 10 by means of bearings or other suitable means allowing the rotation of the plates 15 at the rotation axis R, thus providing an indirect rotational movement around the rotation axis R of the movable bars 5 constrained to the plates 15.

The passenger restraint device 1 according to the present invention is advantageously provided with locking means 12 that allows to lock the at least one moveable bar 5 and consequently allows to restrain the passenger 6 by means of the restraint element 2.

In other words, locking means 12 lock the movement of the movable bar 5 in order to retain the passenger 6 when the movement of the amusement ride starts.

According to embodiments, locking means 12 comprise for example hydraulic cylinders, or mechanical means that interfere with and lock the movement of the movable bar 5.

In the embodiment shown in the Figures, locking means 12 comprise at least one hydraulic cylinder 12a with a respective piston 12b and a control valve 12c. In the embodiment shown in the Figures, the restraint device 1 is provided with two cylinders 12a firmly fastened to the support frame 10; and a movable piston 12b coaxially arranged inside each cylinder 12a.

Each piston 12b is pivotally fastened to the plates 15 thus transmitting the rotational movement about the pivot axis R of the movable bars 5 to the piston 12b. According to embodiments, the number of the cylinder and of the respective movable piston can be varied.

When the electric control valve 12c is opened, the pistons 12b are free to move as a result of the movement of the movable bars 5 at thus of the restraint element 2 constrained thereto.

In fact, during the rotation about the axis R, the support bar 16 and thus also the plates 15 are rotated; in fact, the movable pistons 12b are constrained in a rotatable manner to the plates 15. The rotation of the plates 15 is transformed to a translation movement of the pistons 12b inside the respective cylinder 12a.

When there is the need of locking the movement of the movable bars 5, i.e. when the restraint element 2 is in the close position and it is in contact with the passenger, the locking means 12 are activated. The locking means 12 lock the moveable bars 5 by closing the electric control valve 12c and thus locking the movement of the piston 12b within the cylinder 12a.

By doing so, the movement of the moveable bars 5 and of the restraint element 2 is prevented.

According to an embodiment, the locking means 12 can be used advantageously as moving means for the moveable bar 5. Pressurized fluid can be introduced into the cylinder 12a thus causing the movement of the movable piston 12b. Starting from at least one closed position of the restraint device 1, in which the pistons 12b are retracted inside the cylinders 12a (see FIGS. 1, 4 and 5), the control valve 12c is opened for introducing a pressurized fluid within the cylinders 12a that cause the pistons 12b to move outwardly from cylinder 12a.

The movement of the piston 12b outside the cylinder 12a, as shown in FIG. 1, allow to rotate the movable bars 5 and thus the restraint element 2 about the rotation axis R by means of the kinematic connection made by the plates 15 and the support bar 16. Therefore, the restraint element 2 is moved upwardly to reach at least one open position in which it is not in contact with the passenger.

As described above, advantageously, locking means 12 of the restraint device may be activated only when the at least one sensor 4 detects the contact of the restraint element 2 with at least one part of the passenger 6. The locking means 12 are activated when the at least one sensor 4 enters into contact with at least part of the passenger 6, and in particular with his thighs 11, in the embodiments shown in FIGS. 1 to 7, 10a and 10b.

In particular, the at least one movable element 4a of the at least one sensor 4 is displaced due to the contact with at least part of the passenger 6, so that the contact of the restraint device with the passenger can be detected. By doing so, the movable bar 5 can be locked only when the restraint element 2 has reached the final position in which it is in contact with at least part of the passenger and his effective retention can be achieved.

Therefore, by means of the restraint device according to the present invention, it is possible to effectively secure a passenger of amusement rides, in fact, after the passenger 6 accommodates on a seat 7, the moveable bars 5 are moved in manual or automatic manner and the restraint element 2 is consequently moved towards the passenger 6.

When at least part of the passenger, and in particular the thighs 11 according to the embodiment shown in the FIGS. 1 to 7, and also the upper thighs and/or the abdomen according to the embodiment shown in FIGS. 10a, 10b and 12 to 16, are contacted by the restraint element 2, the at least one sensor 4 detects the contact. The contact detected by the sensor 4 activates locking means 12 that give permission to lock the moveable bars 5 in closed position of the restraint element, herein at least part of the passenger is contacted by the restraint element 2. In the embodiment shown in FIGS. 12 to 16, the contact of the restraint element 2 with the passenger's body is detected by the sensor 4 because the latter is no longer activated, i.e. the movable element 4a is no longer pressed by the press element 31.

In this way, the restraint element 2 cannot be locked in a position in which it is not contacting the passenger, i.e. in positions where a gap is present between the restraint element 2 and the passenger, and in particular his thighs 11 and/or his abdomen.

The present invention also relates to a seat 7, shown in FIGS. 8, 9, 11 and 11a, which can be used in different types of amusement rides, and in particular in different types of vehicles for amusement rides. The seat is intended to be used by a passenger 6, it preferably comprises at least one seat bottom 9 and, even if not shown in embodiment of FIGS. 8, 9, 11 and 11a, seat 7 can be further provided with at least one backrest 8, as shown in the FIGS. 1 to 7. Additionally, the seat 7 according to the invention can be provided with one or more restraint device 1 of the type disclosed above, or with restraint devices for the passengers known in the art, such as for example a belt.

The seat 7 according to the invention may be further provided with at least one sensor 20, 21, 25 to detect the presence of a passenger 6 on the seat 7.

In particular, the at least one sensor can be in the form of an "occupy" sensor 20, 25, i.e. it is activated when the seat is occupied and one or more passengers are accommodated on the seat 7 (as in the embodiment shown in FIGS. 8, 9 and 11a); or it may be in the form of an "empty" sensor 21, i.e. it is activated when the seat 7 is empty and there are no passengers sitting on the seat 7.

According to other embodiments, the at least one sensor 20, 21, 25 intended to detect the presence of at least one passenger 6 on the seat 7 is a contact sensor, and preferably a contact switch sensor.

As described above, when referring to sensor 4 of the restraint device 1 according to the invention, the expression "contact switch sensor" is used herein to indicate a sensor that is able detect the contact with at least part of the passenger 6, or with an abutting surface 22, that causes the displacement of at least one movable element 20a, 21a, 25a of the sensor 20, 21, 25.

Figure 9:
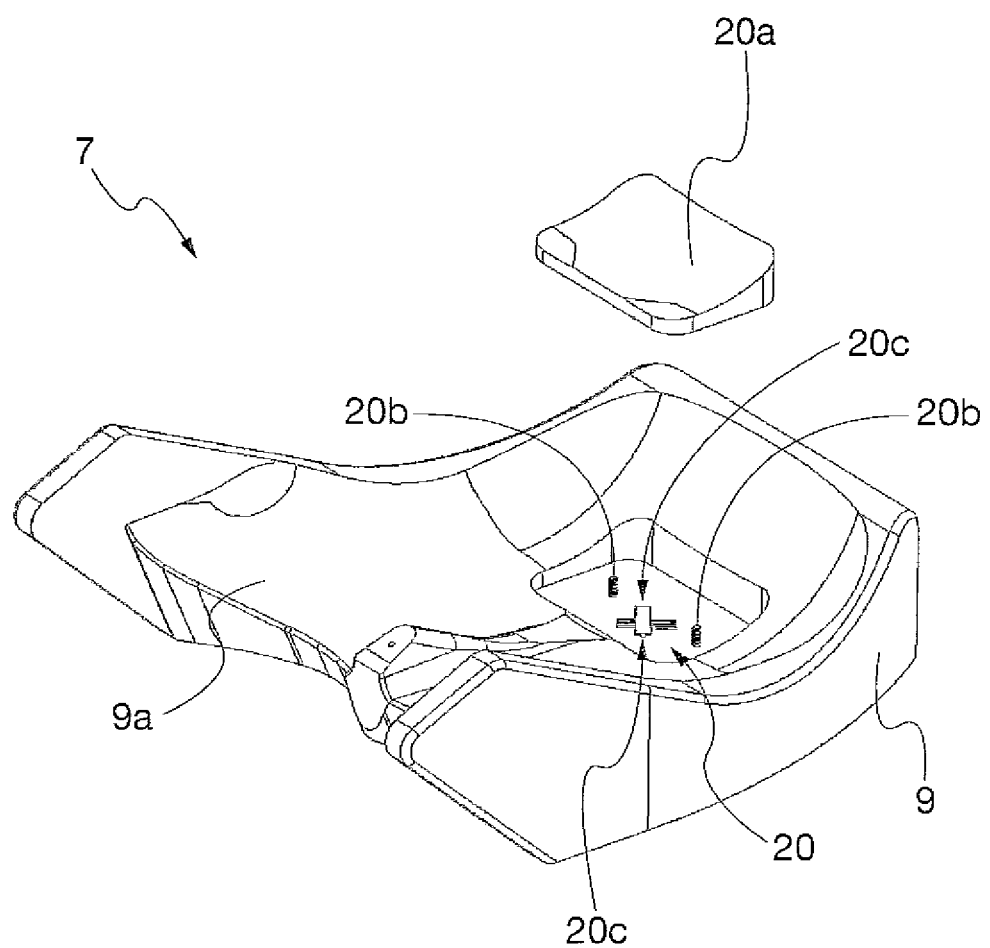
FIG. 9 is a detailed view of the sensor provided in the seat illustrated in FIG. 8.

According to an embodiment, the sensor 20, 21, 25 is a biased contact sensor (and preferably a biased contact switch sensor), for example a "push-button" type sensor, wherein the displacement of a movable element 20a, 21a, 25a of the sensor is biased by an elastic element 20b (shown only with reference to the sensor 20 in FIG. 9).

Figure 8:
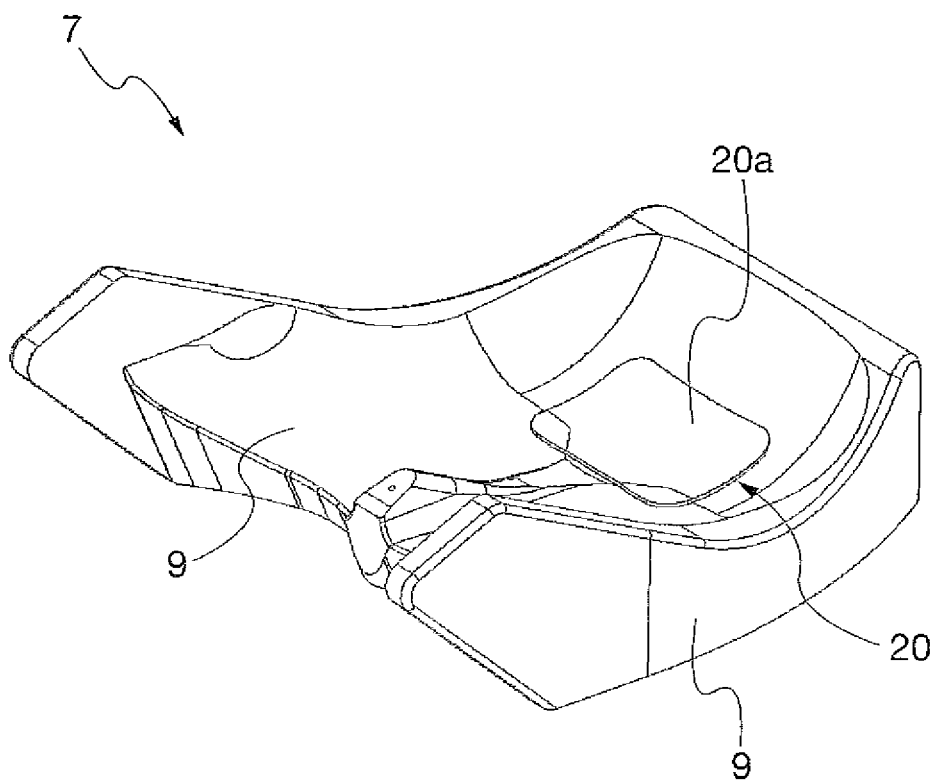
FIG. 8 is a perspective view of a seat for accommodating a passenger.

According to other embodiments, the at least one sensor 20, 21, 25 intended to detect the presence of a passenger 6 on the seat 7 can be arranged on the restraint element 2 (as shown in FIGS. 10a and 10b), or on the seat 7 (as shown in FIGS. 8, 9 and 11a).

As shown in FIGS. 8 and 9, preferably the at least one sensor 20 intended to be activated when the passenger is using seat 7, is arranged on the seat 7. In other words, the sensor 20 detects whether the seat is, or is not, occupied by the passenger 6, preferably during the passengers-loading step of the amusement ride cycle and it is in the form of an occupy sensor, i.e. it is activated when at least one passenger is sitting on seat 7.

As shown in FIG. 9, the sensor 20, intended to detect the contact with the passenger, comprises at least one movable element 20*a* with respect to at least part of the seat bottom 9 of the seat 7. When the seat 7 is occupied by a passenger, the at least one movable element 20*a* is contacted by at least part of the passenger 6 and displaced towards the seat bottom 9.

According to an embodiment of the present invention, the at least one sensor 20 of the seat comprises at least one movable element 20*a* that is intended to be displaced by the contact with at least one part of the passenger 6. The movable element 20*a* of the sensor 20 is arranged within the upper surface 9*a* of seat bottom 9. The movable element 20*a* can be arranged at least in part protruding from the upper surface 9*a*, or at the same level of the upper surface 9*a* of the bottom seat 9.

As visible in FIGS. 8 and 9, the movable element 20*a* of the sensor 20 is movable with respect to the bottom seat 9, when contacted by the passenger 6 that is accommodated on the seat 7.

The sensor 20 comprises one or more elastic elements 20*b* (see FIG. 9), for example made by one or more spring, that maintain spaced from each other electric contacts 20*c* of the sensor 20. When the movable element 20*a* is displaced due to the contact with the passenger sitting on seat 7, electric contacts 20*c* are brought together and coupled. An electrical signal can be generated by the sensor 20.

In the embodiment shown in FIG. 11*a*, the at least one sensor 25 intended to detect the presence of a passenger on the seat 7, is arranged between at least part of the seat 7 and at least one fixed part 26. The expression fixed part 26 is used herein to indicate a part that is not moved when at least one passenger is accommodated on the seat 7. According to embodiments, the fixed part 26 can be a part of the amusement ride, and in particular of the vehicle V, to which the seat is constrained (as for example shown in FIG. 11*a*), or it can be a fixed part of the same seat 7. In other words the seat 7 can be provided with a movable part, for example the seat bottom 9, and a fixed part 26, that is not moved when the passenger is accommodated on the seat 7, for example the backrest of the seat.

In other words, the sensor 25 detects whether the seat is, or it is not occupied, by the passenger 6, preferably during the passengers-loading step of the amusement ride cycle.

In general, at least part of the seat 7 is movable with respect to the fixed part 26 when the passenger is accommodated on the seat 7. According to an embodiment, the at least one sensor 25 is activated when the at least one part of the seat is moved with respect to the fixed part 26. At least one contact sensor 25 can be arranged on the seat 7, preferably on the bottom 9 of the seat, and when a passenger is on the seat, at least part of the bottom 9 is moved towards a fixed part 26, due to the gravity force, therefore the contact sensor is activated because it is contacted by the fixed part 26.

In other words, the movable element 25*a* of the sensor 25 is pressed due to the contact with the fixed part 26, when a passenger is on the seat 7.

According to embodiments not shown in the Figure, the sensor 25 can be arranged on the fixed part 26 of the amusement ride so that it is contacted, and thus activated, when the seat is moved towards the fixed part 26 when a passenger is accommodated on the seat 7.

The sensor 25 can be arranged so that it is activated when the passenger is not on the seat 7, i.e. with a press element that is exerting a pressure on the movable element 25*a* of the sensor when the passenger is not on the seat. In this case, when the passenger is accommodated on the seat 7, due to the movement of the movable part of the seat, for example its bottom 9, the sensor 25 is no longer activated because the movable element 25*a* of the sensor is no longer pressed.

According to an embodiment, and as it is also shown in FIG. 11*a*, the bottom 9 of the seat 7 is movable with respect to a fixed part 26, preferably a fixed part 26 of the amusement ride vehicle V, when at least one passenger is accommodated on the seat.

The movable part of the seat 7 can be moved along different paths when the passenger is accommodated thereon, thus allowing the sensor 25 to detect the presence of the passengers. According to embodiments, the movable part of the seat 7 can be translated along an axis and/or rotated about an axis Z, when at least one passenger is accommodated on the seat 7.

In the embodiment shown in FIG. 11*a*, the bottom 9 of the seat 7 is rotatable about an axis Z substantially arranged perpendicularly with respect to the direction of the gravity force. Therefore, when a passenger is accommodated on the seat 7, the bottom 9 is rotated about the rotation axis Z due to the weight of the passenger. Therefore the sensor 25 can be brought into contact with the fixed part 26, thus allowing the detection of the presence of the passenger on the seat 7.

As described above, the at least one sensor 21, intended to detect whether the seat 7 is occupied, or is not occupied, can be arranged on the restraint element 2. In this case, the at least one sensor 21 cooperates with at least one abutting surface 22 that can be arranged on the seat 7.

The abutting surface 22 (see FIG. 11) is intended to be contacted by the sensor 21 arranged on the restraint element 2 only when the passenger 6 is not accommodated on the seat 7, i.e. when the seat 7 is empty. In other words, the sensor 21 of restraint element 2 works as an "empty" sensor, i.e. it is activated when the seat 7 is not occupied.

The at least one sensor 21 is arranged on the restraint element 2 and it is brought in contact with the correspondent abutting surface 22 only when the passenger 6 is not present on the seat 7. In other words, when the seat is occupied the abutting surface 22 is not contacted by the sensor 21, and the latter is not activated.

In the embodiment shown in FIGS. 10*a* and 10*b*, the restraint element 2 comprises a sensor 21 to detect the presence of a passenger on the seat 7, and the abutting surface 22 is arranged on the seat 7, and preferably on the part of the seat 7 between the thighs of the passenger.

However, different positions of the abutting surface 22 can be obviously provided, and in further embodiments, the abutting surface 22 can be arranged on another part of the amusement device or of the restraint device, and not directly on the seat 7.

The abutting surface 22 is arranged in such a way that it can be contacted by the sensor 21, when the restraint element is moved towards its closure position and the passenger 6 is not present on the seat 7.

As described above, the at least one empty sensor 21 arranged on the restraint element 2 is a contact sensor, and preferably a contact switch sensor in the sense that it is able detect the contact with at least one abutting surface 22 that causes the displacement of at least one movable element 21*a* of the sensor 21.

Figure 11:
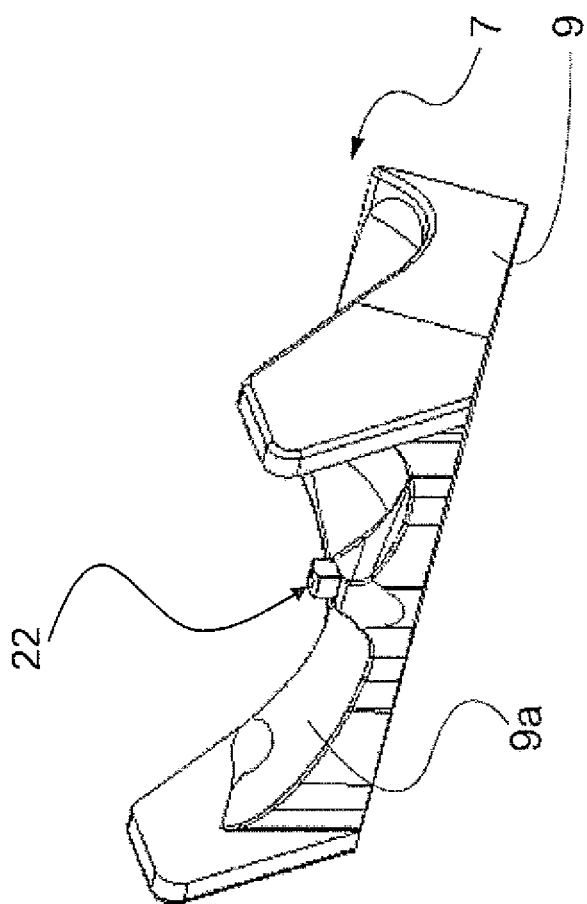
FIG. 11 illustrates a seat provided with an abutting element for an empty sensor of a restraint device.

According to an embodiment, the sensor 21 is a biased contact sensor (and preferably a biased contact switch sensor), for example a "push-button" type sensor, wherein the displacement of a movable element 21a of the sensor is biased by an elastic element (not shown in the Figures). In fact, the sensor 21 is intended to detect the contact with the abutting surface 22 arranged on the seat 7, as shown in FIG. 11. The sensor 21 comprises at least one movable element 21a with respect to restraint element 2. Therefore, when the seat 7 is not occupied by a passenger 6, the at least one movable element 21a is brought in contact with the abutting surface 22, thus causing a displacement of the movable element 21a of the sensor 21.

The movable element 21a of the sensor 20 is arranged within the bottom surface of the restraint element 2, and according to an embodiment it can protrude therefrom in order to contact the abutting surface 22.

Even if not shown in the attached FIGS. 10a and 10b, the sensor 21 comprises one or more elastic elements, for example comprising one or more springs, that maintain spaced electric contacts of the sensor 21 (also not shown in the Figures). When the movable element 21a is displaced due to the contact with the abutting surface 22, when the seat is empty, the electric contacts are coupled and an electrical signal is generated by the sensor 21.

In the embodiment according to FIGS. 12 to 16, when the seat is empty the contact sensor 4 is activated when the restraint element 2 is lowered thus contacting the seat 7, and in particular the bottom 9 of the seat 7, as shown in FIG. 12. In this position the restraint element 2 is rotated with respect to the movable bar 5 and the press element 31 and the movable element 4a of the sensor 4 are distanced. Therefore, in the embodiment shown in FIGS. 12 to 16 it can be useful to provide a sensor 20, 21, 25 intended to detect the presence of a passenger on the seat 7 in order to establish if the deactivation of the sensor 4 is due to the presence of a passenger that is contacted by the restraint element, or if the seat is empty and the restraint element 2 has reached the contact with the bottom 9 of the seat 7, as shown in FIG. 12.

Advantageously, the presence of at least one sensor 20, 21, 25 for determining whether the seat is occupied, or it is not occupied, allows reducing the time load of the amusement ride wherein the restraint device according to the invention is used.

In fact, when the seat is empty, a restraint device of the passenger does not need to be closed before the amusement ride dispatching. This can speed up the loading process of the amusement ride without the need of closing, either manually or automatically, the restraint device of the seats 7 of the ride that are not occupied by a passenger 6.

In general, the presence of the sensor 20, 21, 25 allows verifying the presence of a passenger 6 on the seat 7 on the basis of the information available from the sensor 4 intended to contact the passenger 6.

In fact, if the at least one sensor 4 intended to contact at least one part of the passenger does not detect the contact with the passenger, the sensor 20, 21, 25 is able to confirm that the seat is empty and therefore the amusement ride can be dispatched.

The occupy sensor on the seat is not activated when the seat 7 is empty, therefore it allows to verify if the seat is not occupied. On the other hand, if the occupy sensor 20 is activated, a passenger is sitting on the seat 7 and therefore there is the need to wait the contact of the restraint element 2 with the passenger, detected by the sensor 4, before dispatching the amusement ride, i.e. before authorizing the start of the ride cycle.

When an empty sensor 21 is used, if the seat 7 is occupied by a passenger 6 the sensor 21 will not contact the abutting surface 22 because the passenger's body, i.e. his thighs, will stop the movement downwards of the restraint element 2, carrying sensor 21. It can thus be derived that the seat is occupied. In this case, there is the need to wait the detection, by means of the sensor 4, of the contact of the restraint element 2 with the passenger 6 before dispatching the amusement ride.

In an embodiment, if the seat 7 is empty, the restraint element is moved downwards and the abutting surface 22 will be contacted by the empty sensor 21, confirming that there is no passenger using the seat.

With reference to the attached Figures, it will be now described a method for retaining a passenger of an amusement ride using at least one restraint device according to the invention and described above.

The method comprises the step of moving the restraint element from the at least one open position, in which the restraint element 2 is not in contact with the body of the passenger 6 (see FIG. 1), towards the passenger 6 to reach the at least one closed position, shown in FIGS. 2, 4, 4A, 5 and 5A. This step can be carried out by moving the at least one movable bar 5 to which the restraint element 2 is constrained.

The movement of the at least one movable bar 5 from the at least one open position, towards the passenger, in order to reach at least one closed position, can be obtained by manually operating the restraint element, or the at least one movable bar, or automatically by suitable moving means known in the art.

With reference to FIG. 1, starting from at least one open position in which the restraint element 2 is away from the passenger 6 and the piston 12b is for the most part outside the cylinder 12a; if the electric control valve 12c is opened, the restraint element 2 can be moved towards the passenger 6, as shown in the intermediate configuration of FIG. 3.

In fact, the moveable bars 5 rotate indirectly about the axis R by means of the kinematic links comprising the support bar 16 and the plates 15 that are rotatable about the axis R. The rotational movement causes the retraction of the pistons 12b within the cylinders 12a by means of the pivot constraint between the end of the piston 12b and the plate 15.

Therefore, the movable bars 5 and the restraint element 2 reach at least one closed position in which the restraint element 2 contacts at least part of the passenger's body 6, and in particular the contact surface 3 is in contact with the thighs 11 and/or with the abdomen of a passenger 6 seated on the seat 7.

Advantageously, FIG. 5 shows the restraint element in the closed position wherein it is contact with a small size passenger. In fact, the movable bars 5 can be moved until the restraint element has reached the contact with the passenger.

Additionally, as described above, the restraint element 2 is rotatable with respect to the at least one movable bar 5, so that in the closed position the restraint element 2 is parallel with respect to the plane passing through, or substantially defined by, the part 11 of the passenger's body to be contacted.

Therefore, the method according to the invention, also comprises the step of rotating the restraint element 2 with respect to at least one movable bar 5, to reach a position wherein the restraint element 2 is parallel with respect to the plane passing through, or substantially defined by, the part 11 of the passenger's body to be contacted.

In other words, the restraint element 2, and in particular its at least one contact surface 3, is rotated with respect to the at least one movable bar 5 of an angle β equal to or less than 30°, and preferably equal to or less than 20°, to reach a position where it is parallel to the plane defined by at least one part 11 of the passenger's body to be contacted, and preferably with respect to the plane defined by the passenger's thighs 11.

Preferably the restraint element 2 is freely rotatable with respect to the at least one movable bar 5, thus the relative position of these elements can be automatically reached due to the contact of the restraint element 2 with at least part of the passenger's body. As described above, the restraint device according to the invention can be locked in the closed position for effectively retain a passenger only when the contact between the restraint element 2 and the passenger's body 6 is reached.

In fact, the method comprises the step of detecting by means of the at least one sensor 4 when the restraint element 2 has reached the closed position, wherein it is in contact with at least one part of the passenger 6.

The detection step of the contact between the restraint element 2 and the passenger's body is carried out by the sensor 4, and in particular by means of the at least one movable element 4a of the sensor 4.

In the embodiment shown in the Figures, the at least one sensor 4 is a contact sensor, and preferably a contact switch sensor, and it is able to detect the contact with at least part of the passenger 6. In the embodiment shown in FIGS. 1 to 7, 10a and 10b the contact with the passenger's body causes the displacement of at least one movable element 4a of the sensor. In fact, the movable element that is preferably at least in part protruding from the restraint element 2, is displaced due to the contact with at least a part of the passenger.

As shown in FIGS. 4, 4A, 5 and 5A, in the closed position, the movable element 4a is contacted by the thighs 11 of the passenger and is displaced inwardly against the biasing force exerted by the elastic elements 4b.

By doing so, the movable element 4a is displaced due to the contact with the passenger and the electric contacts 4c are coupled thus allowing the detection of the contact between the passenger and the restraint element.

In the embodiment shown in FIGS. 12 to 16, when the contact between the restraint element 2 and the passenger's body has been reached, the sensor is no longer activated, i.e. the movable element 4a of the sensor is no longer contacted by the press element 31.

The method according to the invention comprises the step of generating at least one signal by means of the sensor 4 when the latter detects the contact of the restraint element 2 with at least one part of the passenger 6. The generated signal from the sensor 4 can be processed by a suitable control unit of the restraint device, not shown in the Figures, and can be used in different ways according to embodiments of the invention. As already described above, in the embodiment shown in FIGS. 12 to 16, when the restraint element 2 contacts the passenger's body 6, the sensor is not activated, i.e. no signal is generated. In fact, according to an embodiment the method comprises the step of activating, or the step of giving the permission to activate, the locking means 12 of the movable bar 5 to lock its movement when the sensor 4 has detected that the restraint element 2 is in contact with the passenger.

In the embodiment of FIGS. 12 to 16, the absence of signal from sensor 4, i.e. the deactivation of sensor 4, can be used as a signal for giving the permission to activate the locking means 12 of the movable bar 5 to lock its movement.

In the embodiment shown in the Figures, the electric control valves 12c are closed so that the pistons 12c is locked in the retracted position within the cylinders 12a, as shown in FIGS. 2, 4 and 5. Consequently the restraint element 2 constrained to the moveable bars 5 restrains the passenger 6 in the seat 7, in fact, the movable bars 5 are locked in the closed position.

In this case, the signal generated by the sensor 4, or the absence of signal in the embodiment of FIGS. 12 to 16, after the detection of the contact between the restraint element 2 and the passenger 6 is used to give permission to activate the locking means 12 of the movable bar 5.

However, according to embodiments, the signal generated by the sensor 4 can be used to activate visible or acoustic indicators showing that the restraint device 2 has reached the closed position by contacting the passenger thus ensuring an effective retention. The method according to the invention also comprises the step of detecting the presence of at least one passenger 6 on the seat 7 by one or more sensors 20, 21, 25 described above.

In particular, the sensor 20, 21, 25 can be used to verify whether the seat 7 is occupied, or it is not occupied, depending on the detection of the contact with the passenger by means of the at least one sensor 4.

In fact, if no contact between the restraint element and the passenger's body has been detected by means of the sensor 4, there is the need to verify if the seat is really empty.

Therefore, the amusement ride having the restraint device according to the invention provides a safety control of the presence of the passenger on the seat before dispatching the ride.

In fact, the method comprises the step of verifying that the at least one seat 7 is empty when the sensor 4 has not detected the contact of the restraint element 2 with at least one part 11 of the passenger 6, thus avoiding the start of the ride in the case the passenger is present on the seat and the restraint element is not correctly brought into contact with the passenger.

In particular, if an occupy sensor 20, 25 is used, it is activated only when the passenger is on the seat 7, therefore it can be also detected when the seat is empty, in fact, in this condition also the occupy sensor 2 is not activated.

If an empty sensor 21 is used, the sensor 21 contacts the abutting surface 22 thus activating the sensor 21 when the passenger is not present on the seat and the movement of the restraint element 2 towards its closed position terminates in the position wherein the sensor 21 is contacting the abutting surface 22. Again, in this condition sensor 4 does not generate a signal.

A combination of sensors 20, 21, 25 can also be provided in the seat 7 according to the invention.

What is claimed is:

1. An apparatus, comprising:
  at least one amusement ride seat, each seat including:
    at least one restraint device adapted to secure at least one passenger on the seat; and
    at least one sensor, including a contact sensor and/or a contact switch sensor, adapted to detect a presence of the passenger on the seat;
  wherein the restraint device includes a movable bar movable between an open position and a closed position.

2. The apparatus according to claim 1, further comprising at least a portion of the restraint device adapted to contact a body part of the passenger to secure the passenger on the seat.

3. The apparatus according to claim 1, wherein the seat includes at least one seat bottom, the sensor including at least one movable element with respect to at least part of the seat bottom of the seat, the movable element adapted to be contacted by a body part of the passenger and displaced towards the seat bottom.

4. The apparatus according to claim 1, wherein the sensor is arranged on the restraint device and/or restraint element and is adapted to detect a contact between abutting surfaces when the seat is unoccupied.

5. The seat according to claim 4, wherein at least one of the abutting surfaces is arranged on the seat.

6. The seat according to claim 4, wherein at least one of the abutting surfaces is arranged on the bottom of the seat.

7. The apparatus according to claim 1, wherein the sensor is arranged between at least part of the seat and at least one fixed part, at least part of the seat adapted to be movable with respect to the fixed part when a passenger is accommodated on the seat, the sensor adapted to detect a presence of the passenger on the seat by movement of at least one movable part of the seat with respect to the fixed part.

8. The apparatus according to claim 7, wherein the seat includes a bottom movable with respect to at least one of the at least one fixed part when at least one passenger is accommodated on the seat.

9. The apparatus according to claim 7, wherein the movable part of the seat is translatable along an axis and/or rotatable about an axis, when at least one passenger is accommodated on the seat.

10. The apparatus according to claim 1, further comprising an amusement ride vehicle, the seat being provided on the amusement ride vehicle.

11. The apparatus according to claim 1, wherein the movable bar is pivotable about a rotation axis.

12. The apparatus according to claim 1, wherein the movable bar is rigid.

13. An apparatus, comprising:
an amusement ride seat, including:
   at least one restraint device adapted to secure at least one passenger on the seat,
   at least one sensor, including a contact sensor and/or a contact switch sensor, adapted to detect a presence of at least one passenger on the seat; and
   a detection device adapted to detect locking of the restraint device in at least one position when the passenger is secured to the seat;
wherein the restraint device includes a movable bar movable between an open position and a closed position.

14. The apparatus according to claim 13, further comprising at least a portion of the restraint device adapted to contact a body part of the passenger to secure the passenger on the seat.

15. The apparatus according to claim 13, wherein the seat includes at least one seat bottom, the sensor including at least one movable element with respect to at least part of the seat bottom of the seat, the movable element adapted to be contacted by at least one body part of the passenger and displaced towards the seat bottom.

16. The apparatus according to claim 13, wherein the sensor is arranged on the restraint device and/or restraint element and is adapted to detect a contact between abutting surfaces when the seat is unoccupied.

17. The apparatus according to claim 16, wherein at least one of the abutting surfaces is arranged on the seat.

18. The apparatus according to claim 16, wherein at least one of the abutting surfaces is arranged on the bottom of the seat.

19. The apparatus according to claim 13, wherein the sensor is arranged between at least part of the seat and at least one fixed part, at least part of the seat adapted to be movable with respect to the fixed part when a passenger is accommodated on the seat, the sensor adapted to detect a presence of the passenger on the seat by movement of at least one movable part of the seat with respect to the fixed part.

20. The apparatus according to claim 19, wherein the seat includes a bottom movable with respect to at least one of the at least one fixed part when at least one passenger is accommodated on the seat.

21. The apparatus according to claim 19, wherein the movable part of the seat is translatable along an axis and/or rotatable about an axis, when at least one passenger is accommodated on the seat.

22. The apparatus according to claim 13, further comprising an amusement ride vehicle, the seat being provided on the amusement ride vehicle.

23. The apparatus according to claim 13, wherein the movable bar is pivotable about a rotation axis.

24. The apparatus according to claim 13, wherein the movable bar is rigid.

* * * * *